United States Patent [19]
Kusunoki

[11] Patent Number: 6,128,314
[45] Date of Patent: Oct. 3, 2000

[54] METHOD AND APPARATUS FOR CAPTURING A COMMUNICATION ATTRIBUTE CONVERTING APPARATUS, AND A SYSTEM CONTAINING THE APPARATUS

[75] Inventor: Masashi Kusunoki, Kawasaki, Japan

[73] Assignee: Fujitsu Limited, Kanagawa, Japan

[21] Appl. No.: 08/724,873

[22] Filed: Oct. 3, 1996

[30] Foreign Application Priority Data

Oct. 12, 1995 [JP] Japan .................................. 7-264043

[51] Int. Cl.$^7$ ................................. H04J 3/16; H04J 3/22
[52] U.S. Cl. .......................... 370/466; 370/524; 370/469
[58] Field of Search .................................. 370/465, 468, 370/467, 469, 524, 410, 264; 395/285, 831

[56] References Cited

U.S. PATENT DOCUMENTS

| | | | |
|---|---|---|---|
| 5,483,530 | 1/1996 | Davis et al. | 370/229 |
| 5,550,906 | 8/1996 | Chau et al. | 379/207 |
| 5,563,882 | 10/1996 | Bruno et al. | 379/200 |
| 5,764,750 | 6/1998 | Chau et al. | 370/229 |
| 5,790,802 | 8/1998 | Van Loon et al. | 395/200.61 |
| 5,826,017 | 10/1998 | Holzmann | 395/200.6 |
| 5,838,782 | 11/1998 | Lindquist | 379/230 |

FOREIGN PATENT DOCUMENTS 2113742  4/1990  Japan .

*Primary Examiner*—Ajit Patel
*Attorney, Agent, or Firm*—Helfgott & Karas, PC.

[57] ABSTRACT

In a system in which terminals having mutually differing communication attributes perform communication so as to bridge one or a plurality of networks, to provide a method for automatic capture of a communication attribute converting apparatus in a switching apparatus for the control of automatic capture and control of communication attributes of the terminals, if there is a communication attribute converting apparatus which is capable of converting the communication attributes in a station containing a calling terminal, the convertible communication attributes are entered into the information elements of a call setting message of a call setting message and the message is sent to the station containing the receiving terminal. At the station containing the receiving terminal, when this call setting message is received, if there are communication attributes which can be converted and these communication attributes coincide with the communication attributes of the receiving terminal, a request to capture a communication attribute converting apparatus which is capable of converting the communication attributes of the calling terminal is entered into the information elements which are used for transfer of control information between networks and sent to the station containing the calling terminal. At the station containing the calling terminal, a communication attribute converting apparatus is captured in response to this capture request.

31 Claims, 32 Drawing Sheets

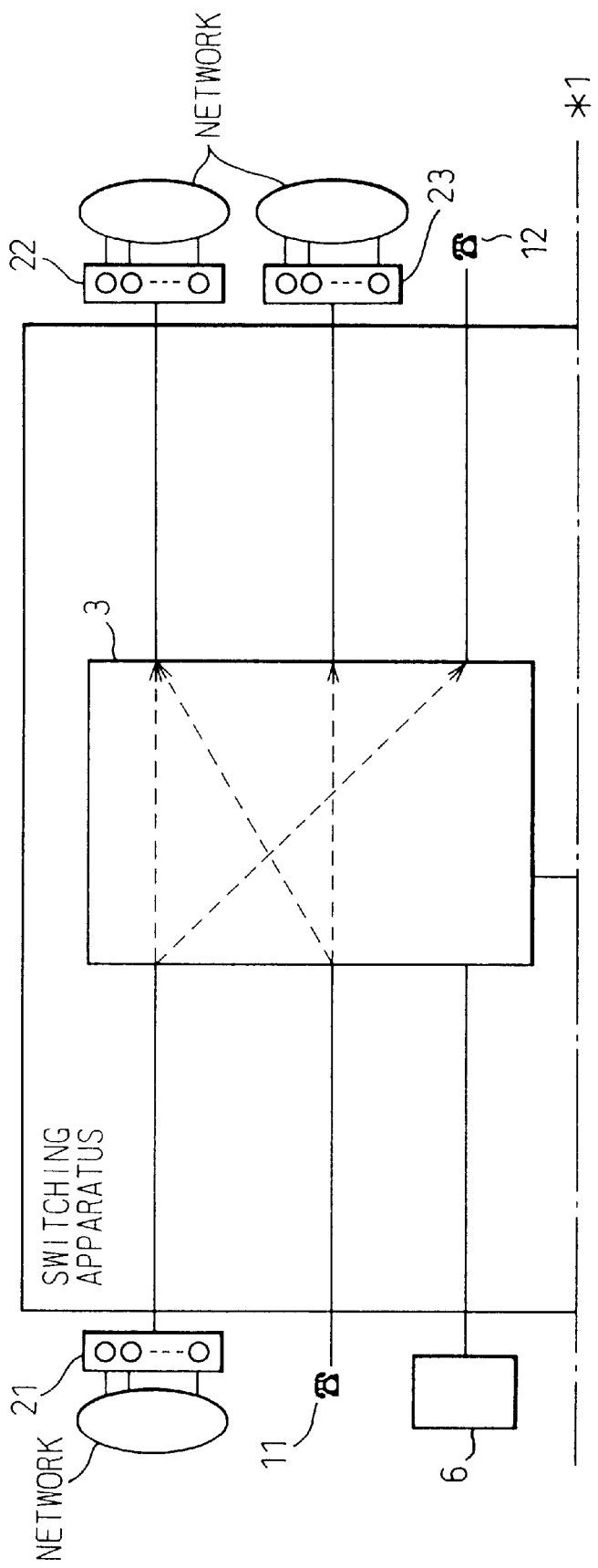

Fig.2A

| SETUP IDENTIFIER | BEARER INFORMATION ELEMENTS | LOW-ORDER LAYER INFORMATION ELEMENTS | HIGH-ORDER LAYER INFORMATION ELEMENTS | FACILITIES INFORMATION ELEMENTS |

Fig.2B

| DISC IDENTIFIER | CAUSE DISPLAY INFORMATION ELEMENTS | FACILITIES DATA ELEMENTS |

Fig.2C

| FACILITY IDENTIFIER | FACILITIES INFORMATION ELEMENTS |

Fig.2D

| FACILITY ACK IDENTIFIER | FACILITIES INFORMATION ELEMENTS |

Fig. 3A

SETUP/DISC FACILITIES
INFORMATION ELEMENTS

| 0 0 0 1 1 1 0 0 |
|---|
| LENGTH OF CONTENTS |
| 0 0 0 0 0 0 0 1 |
| X X X X X X X X    *1) |
| LENGTH OF CONTENTS |
| 1 0 0 0 0 1 0 0 |
| — SUPPLEMENTARY DATA —   *2) |
| (SPECIFIED BETWEEN NETWORKS) |

*1) ATTRIBUTE SWITCHING SERVICE VALUE
*2) {COMMUNICATION ATTRIBUTES a → XXXXXXXX
    {COMMUNICATION ATTRIBUTES b → YYYYYYYY

Fig. 3B

FACILITY FACILITIES
INFORMATION ELEMENTS

| 0 0 0 1 1 1 0 0 |
|---|
| 0 0 0 0 0 1 0 1 |
| 0 0 0 0 0 0 0 1 |
| X X X X X X X X    *1) |
| 0 0 0 0 0 0 1 0 |
| 1 0 0 0 0 0 0 1 |
| SUPPLEMENTARY DATA    *2) |

*1) ATTRIBUTE SWITCHING SERVICE VALUE
*2) SWITCHING APPARATUS CAPTURE → ZZZZZZZZ

Fig. 3C

FACILITY_ACK FACILITIES
INFORMATION ELEMENTS (REQUEST SUCCEEDED)

| 0 | 0 | 0 | 1 | 1 | 1 | 0 | 0 |
|---|---|---|---|---|---|---|---|
| 0 | 0 | 0 | 0 | 0 | 1 | 0 | 0 |
| 0 | 0 | 0 | 0 | 0 | 0 | 0 | 1 |
| X | X | X | X | X | X | X | X |
| 0 | 0 | 0 | 0 | 0 | 0 | 0 | 1 |
| 1 | 0 | 0 | 0 | 0 | 0 | 1 | 0 |

*1) ATTRIBUTE SWITCHING SERVICE VALUE

Fig. 3D

FACILITY_ACK FACILITIES
INFORMATION ELEMENTS (REQUEST FAILED)

| 0 | 0 | 0 | 1 | 1 | 1 | 0 | 0 |
|---|---|---|---|---|---|---|---|
| 0 | 0 | 0 | 0 | 0 | 1 | 0 | 0 |
| 0 | 0 | 0 | 0 | 0 | 0 | 0 | 1 |
| X | X | X | X | X | X | X | X |
| 0 | 0 | 0 | 0 | 0 | 0 | 0 | 1 |
| 1 | 0 | 0 | 0 | 0 | 0 | 1 | 1 |

*1) ATTRIBUTE SWITCHING SERVICE VALUE

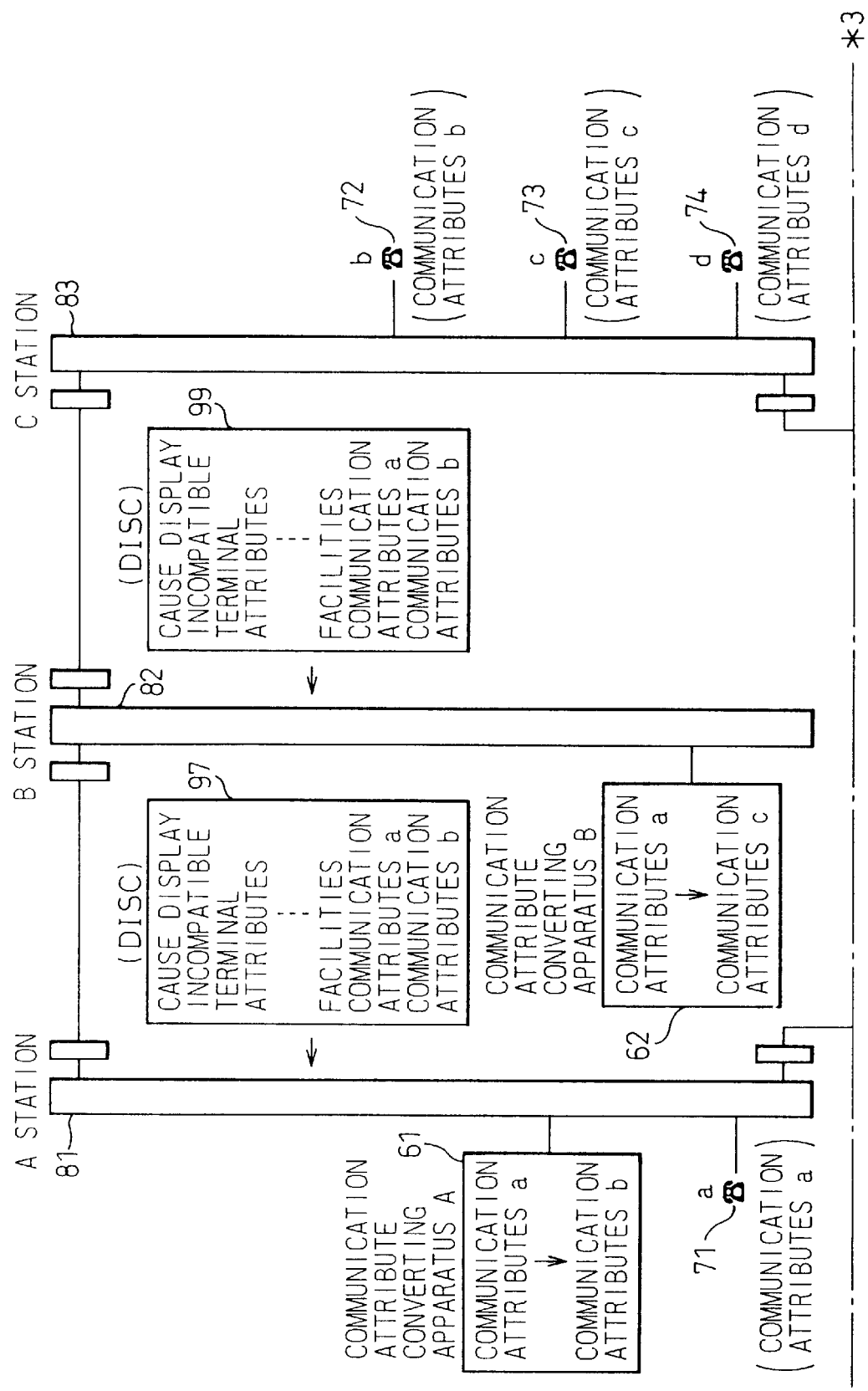

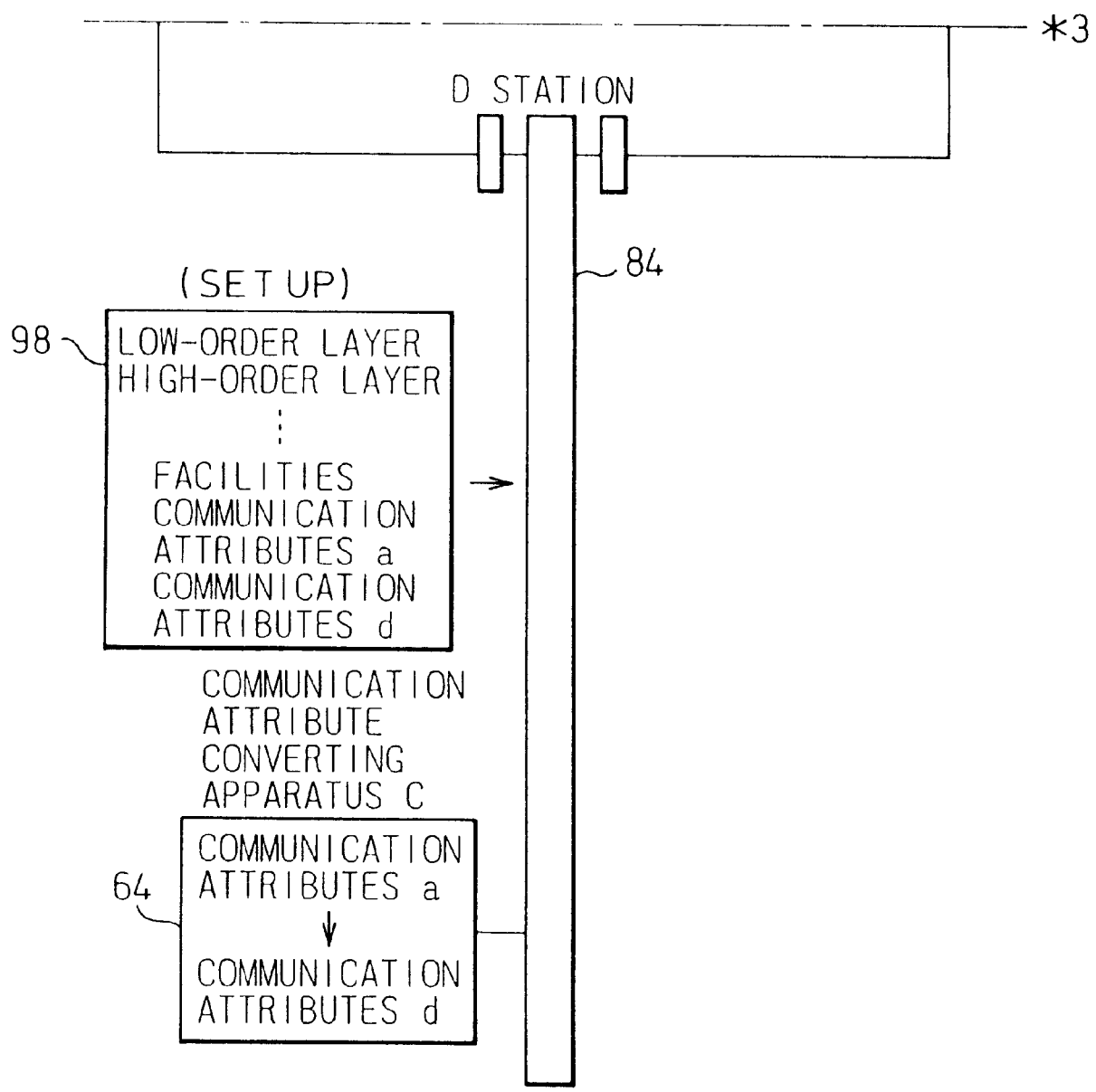

METHOD AND APPARATUS FOR CAPTURING A COMMUNICATION ATTRIBUTE CONVERTING APPARATUS, AND A SYSTEM CONTAINING THE APPARATUS

BACKGROUND OF THE INVENTION

1. Field of the Invention

The present invention relates to a method of automatically capturing a communication attribute converting apparatus in a switching apparatus for the purpose of automatically capturing and controlling the communication attributes of terminals in an information network when one or more terminals, have communication attributes that mutually differ and are defined as low-order layer data or high-order layer data, span a network or a plurality of networks, and to an apparatus using that method.

2. Description of Related Art

In recent years, accompanying a rise in the level of switching services for multimedia, there has been a strong demand for connections between terminals having differing communication attributes. It is necessary to meet this demand while making effective use of existing switching services, without making the operation complex and while providing a simpler system without a drop in switching system performance.

In the past, in networks made up of electronic switching exchanges which support the ISDN protocol, when communication is performed between terminals which have differing communication attributes defined as low-order layer data or high-order layer data, when the station containing the receiving terminal receives the call setting message (SETUP), a judgment is made with regard to the communication attributes of the calling terminal, which are contained in the low-order layer information elements and high-order layer information elements of that call setting message.

In the case in which the communication attributes of the calling terminal differ from those of the receiving terminal, if there is in the station containing the receiving terminal a communication attribute converting apparatus which can convert the communication attributes of the calling terminal to those of the receiving terminal, the communication attribute converting apparatus is captured and the call is received. If, however, there is no such communication attribute converting apparatus, "mismatched terminal attributes" is entered into the cause display of a disconnect message (DISC) and a request to disconnect is made.

If the user knows the communication attributes of the other terminal beforehand, it is possible for the user to dial a special number for the purpose of capturing a corresponding communication attribute converting apparatus, so that the station containing the calling terminal captures the communication attribute converting apparatus, enabling transmission to a terminal which has different communication attributes.

However, in the case in which there is no communication attribute converting apparatus in the station containing the receiving terminal, automatic connection of terminals having differing communication attributes is not performed, and even if the station containing the calling terminal has a communication attribute converting apparatus, because it is necessary for the user to verify the communication attributes of the other terminal before calling, systems in the past were deficient in terms of convenience and ease of use. This was a particularly large problem in multimedia networks, in which a wide variety of terminals are connected.

SUMMARY OF THE INVENTION

An object of the present invention is to provide, in the case of performing communication between terminals having differing communication attributes via an ISDN network, a automatic method for capturing a communication attribute converting apparatus which automatically captures a communication, an attribute converting apparatus when there is, in any station in the network communication an attribute converting apparatus which can convert the communication attributes of a calling terminal to the communication attributes of a receiving terminal and, further, to provide a communication attribute converting apparatus.

According to the present invention, a method of automatically capturing a communication attribute converting apparatus is provided in the case in which communication is performed between terminals which have mutually differing communication attributes in a network made up of electronic switching exchanges which support the ISDN protocol, this method including, (1) in the station containing the calling terminal, if there is a communication attribute converting apparatus that can convert the communication attributes of the calling terminal to the communication attributes of the receiving terminal, the entering of convertible communication attributes into information elements which can be used for transfer of control information between networks and which can be added to the ISDN layer 3 call setting message and sending of this to the station which contains the receiving terminal, (2) in the station containing the receiving terminal, when the above-noted ISDN layer 3 call setting message is received, if there are not only communication attributes which can be converted to the communication attributes of the calling terminal in the above-noted information elements which are used for control information transfer between networks but also one of them coincides with the communication attributes of the receiving terminal, the entering of a request to capture a communication attribute converting apparatus which can perform conversion to the communication attributes of the receiving terminal into the information elements used for control information transfer between networks and which can be added to an ISDN layer 3 supplementary service message, and the sending of this to the station which contains the calling terminal, (3) in the station containing the calling terminal, when the above-noted ISDN layer 3 supplementary service message is received, in the case in which there is, in the information elements used for control information transfer between networks, the above-noted request to capture a communication attribute converting apparatus which can perform conversion to the communication attributes of the receiving terminal, the capture of the communication attribute converting apparatus, the entering into the information elements used for control information transfer between networks which can be added to an ISDN layer 3 supplementary service verification message of whether or not capture is possible, and the sending of this to the station which contains the receiving terminal, (4) in the above-noted station containing the receiving terminal, when the above-noted ISDN layer 3 supplementary service verification message is received, in the case in which the above-noted information element indicates capture is possible, the causing of the receiving terminal to receive the call and the sending of the ISDN layer 3 calling message and response message to the calling station, and (5) in the case in which the above-noted information elements indicate that capture is not possible, the sending of the ISDN layer 3 disconnect message to the calling terminal.

The above-noted method additionally includes, at a relay station, (1) when the above-noted call setting message is received from the above-noted station which contains the calling terminal, the extraction of the communication attributes of the calling terminal from the low-order layer data or high-order layer information which accompanies the call setting message, (2) in the case in which there is a communication attribute converting apparatus which can perform conversion to the communication attributes of the calling terminal, the addition of the convertible communication attributes to above-noted information elements used for control information transfer between networks, (3) when the supplementary service message is received from the above-noted station which contains the receiving terminal, if there is a communication attribute converting apparatus which can perform conversion to the communication attributes of the receiving terminal, the capture thereof and the entering into the information elements used for control information transfer between networks which can be added to an ISDN layer 3 supplementary service verification message of whether or not capture is possible and the sending of this to the station which contains the receiving terminal, (4) in the case in which there is no above-noted communication attribute converting apparatus, the relaying of the above-noted supplementary service message from the station which contains the receiving terminal, and (5) when the supplementary service message is received from the station which contains the receiving terminal, in the case in which there is a communication attribute converting apparatus which can perform conversion to the communication attributes of the receiving terminal, but capture is not possible, the relaying of a supplementary service message from the station which contains the receiving terminal.

According to the present invention, a method of automatically capturing a communication attribute converting apparatus is provided, this method including, (1) when, at the station containing the receiving terminal, an ISDN layer 3 call setting message is received, in the case in which communication attributes of the low-order layer data and high-order layer data accompanying this message are different from those of the receiving terminal, the entering into the cause display element of an ISDN layer 3 disconnect message "incompatible terminal attributes," and the entering of the communication attributes of the calling terminal and the communication attributes of the receiving terminal into the information elements used for control information transfer between networks and which can be added thereto and (2) when, at the station which contains the calling terminal, the above-noted ISDN layer 3 disconnect message is received, in the case in which not only the cause display information element accompanying the above-noted disconnect message is "incompatible terminal attributes" but also the communication attributes of the calling terminal and the receiving terminal exist in the information elements used for transfer of control information between networks and it is possible to capture a communication attribute converting apparatus which can perform conversion of the communication attributes of the calling terminal to the communication attributes of the receiving terminal, the capturing of that communication attribute converting apparatus, the changing of the communication attributes of the calling terminal which are defined by the low-order layer data and high-order layer data to the communication attributes of the receiving terminal, and the resending of the ISDN layer 3 call setting message to the station which contains the receiving terminal.

The above-noted method additionally includes, in the above-noted station which contains the calling terminal or a relay station, (1) the extraction and storage of the station number based on the dialing information at the time of calling, (2) when the above-noted disconnect message is received from the station which contains the receiving terminal, in the case in which either there is no communication attribute converting apparatus which can perform conversion of the communication attributes of the calling terminal to the communication attributes of the receiving terminal or it cannot be captured, the capture of an alternate channel to perform alternate routing, based on the station number stored as noted above and the sending of a call setting message via the above-noted alternate channel, the call setting message having the communication attributes of the calling terminal and the receiving terminal entered into the information elements used for transfer of control information between networks and which can be added to an ISDN layer 3 call setting message. At the alternate station the method includes, (1) in the case in which it is possible to capture a communication attribute converting apparatus which can perform conversion of the communication attributes of the calling terminal to the communication attributes of the receiving terminal, the capture of the communication attribute converting apparatus and sending of a call setting message in which the communication attributes of the calling terminal which are defined by the low-order layer data and high-order layer data are changed to the communication attributes of the receiving terminal, and (2) in the case in which capture of a communication attribute converting apparatus capable of conversion is not possible, the relaying of the above-noted received call setting message. At the station which contains the receiving terminal, when the above-noted call setting message is received, if not only do the low-order layer data and high-order layer data communication attributes accompanying the above-noted call setting message differ from the communication attributes of the receiving terminal, but also the communication attributes of the calling terminal and the receiving terminal exist in the information elements used for transfer of control information between networks, the method also includes the sending of a disconnect message without adding to it the information elements which are used for transfer of control information between networks.

Additionally, according to the present invention, an automatic communication attribute converting apparatus capturing apparatus which executes the above-described method and a communication system which includes this automatic communication attribute converting apparatus capturing apparatus are provided.

BRIEF DESCRIPTION OF THE DRAWINGS

The present invention will be more clearly understood from the description as set forth below, with reference being made to the accompanying drawings, wherein:

FIGS. 1A and 1B are block diagrams which show the basic configuration of the automatic communication attribute converting apparatus capturing apparatus according to the present invention;

FIG. 2A is a drawing which shows the general SETUP message format used in the present invention;

FIG. 2B is a drawing which shows the general DISC message format used in the present invention;

FIG. 2C is a drawing which shows the general FACILITY message format used in the present invention;

FIG. 2D is a drawing which shows the general FACILITY_ACK message format used in the present invention;

FIG. 3A is a drawing which shows an example of the facilities information elements shown in FIG. 2A and 2B;

FIG. 3B is a drawing which shows an example of the facilities information elements shown in FIG. 2C;

FIG. 3C is a drawing which shows an example (request succeeds) of the facilities information elements shown in FIG. 2D;

FIG. 3D is a drawing which shows an example (request fails) of the facilities information elements shown in FIG. 2D;

FIGS. 5A and 5B are drawings which show an example of a network configuration for the case in which a communication attribute converting apparatus is extracted when a call disconnected, according to the present invention;

DESCRIPTION OF PREFERRED EMBODIMENTS

Figure 1B:
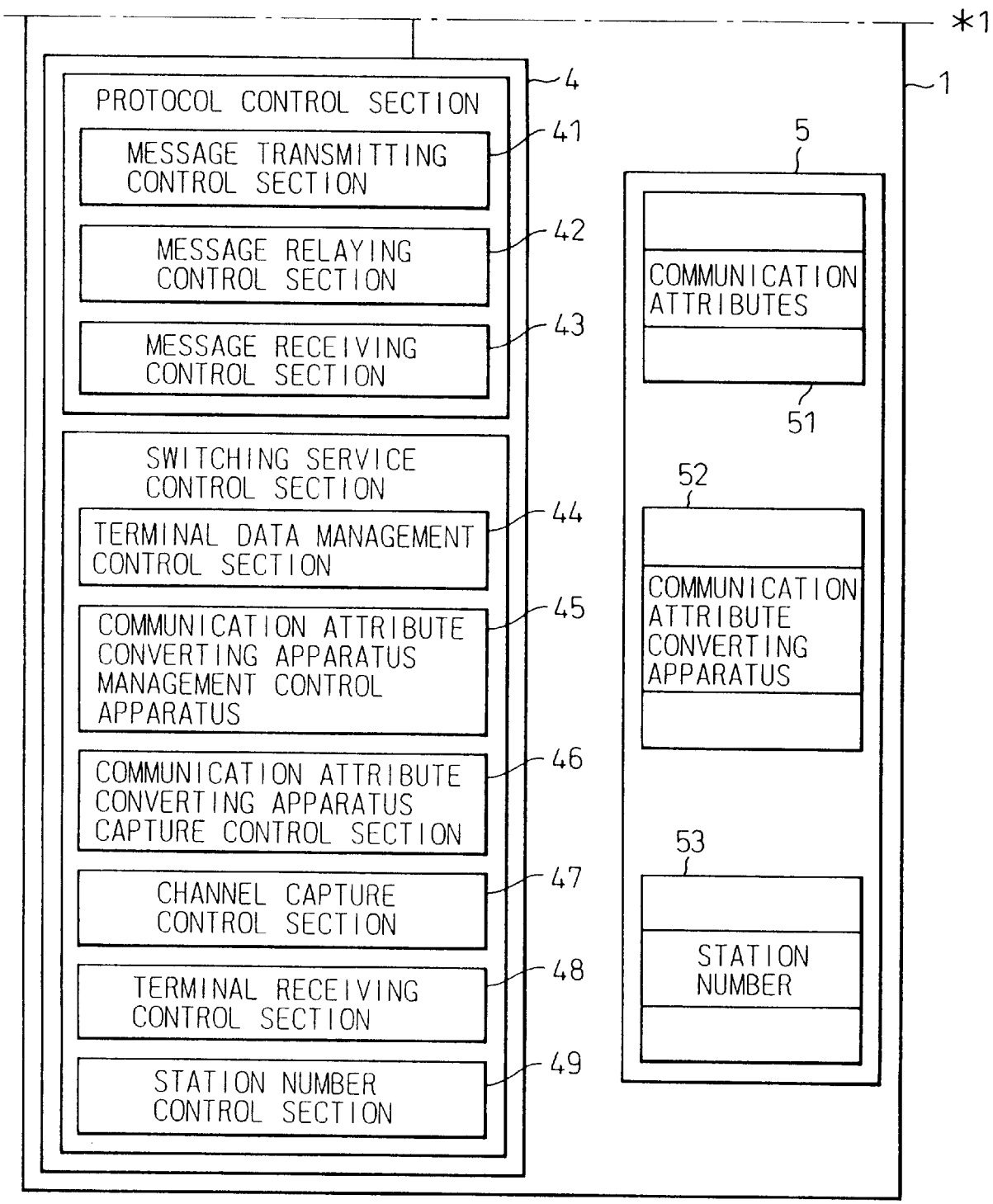

FIGS. 1A and 1B show the basic block diagram configuration of electronic switching equipment to implement a communication attribute converting apparatus automatic capturing apparatus according to the present invention.

In FIGS. 1A and 1B, reference numeral 1 denotes an electronic switching apparatus that is the subject of the present invention, 11 and 12 are telephone terminals connected to the electronic switching apparatus 1, with 11 being the calling terminal and 12 being the receiving terminal, 22 though 23 are communication channels, with channel 21 being for receiving, channel 22 being for calling, and channel 23 being an alternate channel. The numeral 3 denotes a switch for the purpose of switching and connecting the communication paths of the above-noted terminals 11 and 12 and channels 21 through 23, and 6 is a communication attribute converting apparatus which is connected to the electronic switching apparatus 1.

In the same drawing, 4 is a central processing apparatus, which is divided into a protocol control section which performs processing of communication messages and a switching service control section for the purpose of executing switching service processing.

The protocol control section includes a message transmitting control section 41 which performs editing and sending of messages, a message relay control section 42 which edits relay messages, and a message receiving control section 43 which distinguishes the content of received messages.

The switching service control section includes a terminal data management control section 44 which performs extraction and determination of terminal communication attributes, a communication attribute converting apparatus management control section 45 which performs extraction and distinguishing of a communication attribute converting apparatus, a communication attribute converting apparatus capture control section 46 which performs capture of a communication attribute converting apparatus, a channel capture control section 47 which performs capture processing of a channel, a terminal receiving control section 48 which controls reception of calls at a terminal, and a station number control section 49 which stores the station number extracted from dialed number information.

In FIGS. 1A and 1B, the reference numeral 5 denotes a main memory, which includes terminal data 51, in which is stored the communication attributes of a terminal, communication attribute converting apparatus data 52, in which is stored the type of communication attribute converting apparatus, and a station number storage area 53, in which is stored a station number.

FIGS. 2A through 4B show the formats of communication messages used mainly in the present invention.

FIG. 2A through FIG. 2D illustrate the positions of information elements accompanying each of the communication messages that are particularly related to the present invention. The ISDN used here is based on the Teline protocol (TPH2256), a protocol that is used in ISDN relay line supplementary services in Japan, the US and Australia.

FIG. 2A shows the ISDN layer 3 call setting message (hereinafter referred to as the SETUP message). The information elements accompanying this SETUP message are indicated as the low-order information elements comprising information such as communication speed and connection conditions, the high-order information elements comprising such information as the terminal type, and the facilities information elements, into which information can be added at each station. The bearer information elements have the same contents as the low-order information elements, and because the low-order information elements are optional, these bearer information elements are mainly used in the SETUP message.

FIG. 2B shows the disconnect message (hereinafter referred to as the DISC message). The cause display information elements contain the cause for a disconnection as a notification to the other terminal. FIG. 2C shows the supplementary service message (hereinafter referred to as the FACILITY message), and FIG. 2D shows the supplementary service response message (hereinafter referred to as the FACILITY_ACK message). The above-noted messages can have the above-described facilities information elements, for example, added to them.

FIG. 3A through FIG. 3D show examples of the format of facilities information elements added to each of the messages that are shown in FIG. 2A through FIG. 2D. The value of the identifier of the facilities information elements is the "00011100" of the first octet. The fourth octet of each of the facilities information elements indicates the attribute conversion service. The added data region of the facilities information elements added to the SETUP/DISC message shown in FIG. 3A has included in it such information as the calling terminal communication attributes a or the receiving terminal communication attributes b, and the added data region of the facilities information elements added to the FACILITY message shown in FIG. 3B has included in it a communication attribute converting apparatus capture request.

The bit format of the facilities information elements added to the FACILITY_ACK message shown in FIG. 3C is used in the case of the "request succeeded" which uses the FACILITY message of FIG. 3B. On the other hand, if the result is "request failed" the bit format of the facilities information elements added to the FACILITY_ACK message shown in FIG. 3D is used.

To facilitate understanding of the present invention, before beginning a detailed description of the present invention, a specific embodiment of the present invention will be described, with reference made to FIG. 4A through FIG. 6.

Figure 4A:
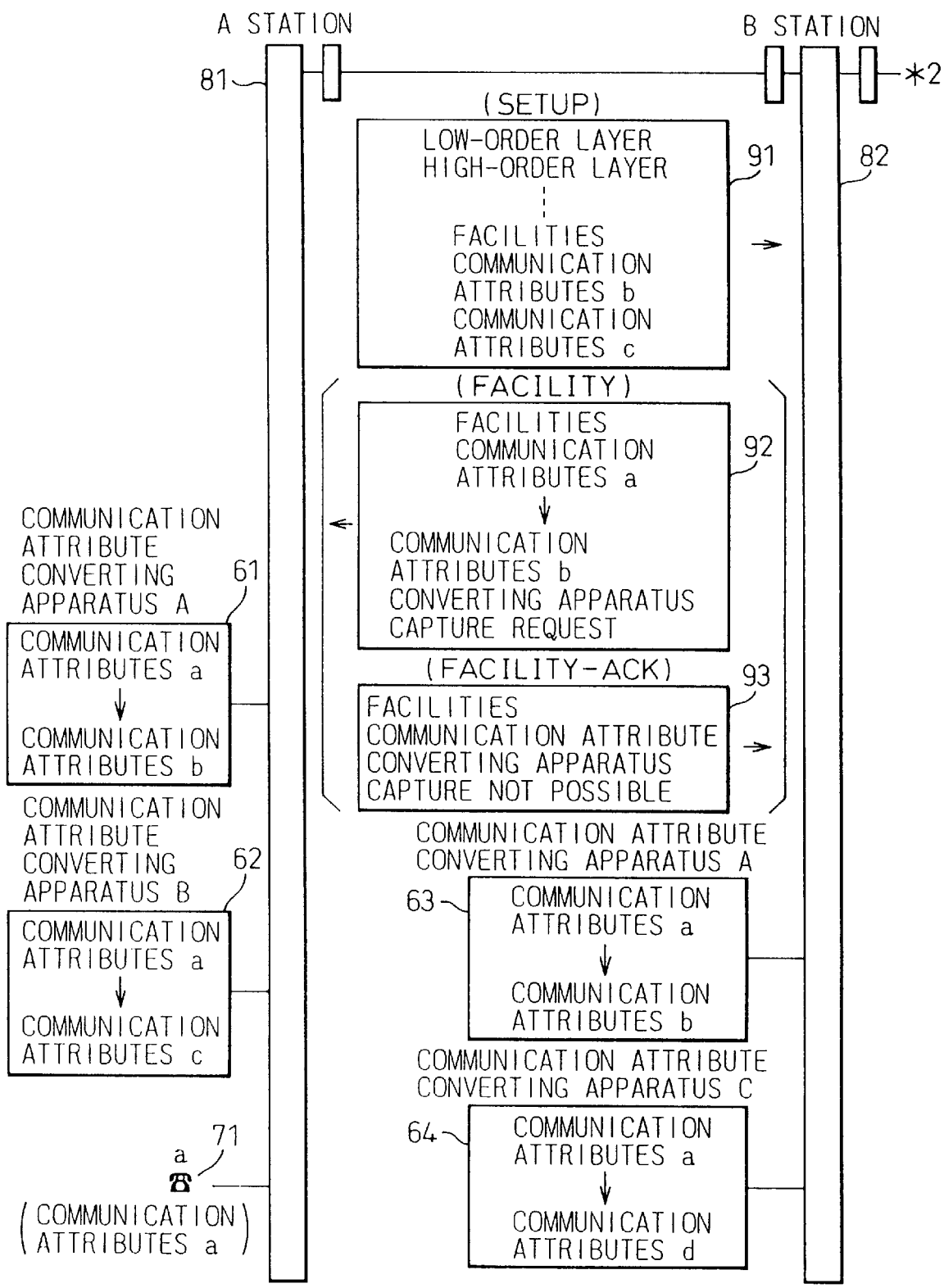
FIGS. 4A and 4B are drawings which show an example of a network configuration for the case in which a communication attribute converting apparatus is extracted when a call is set, according to the present invention.

FIGS. 4A and B show an example of configuration of a network for the case in which a communication attribute converting apparatus is extracted according to the present invention at the time of call setup.

Figure 4B:
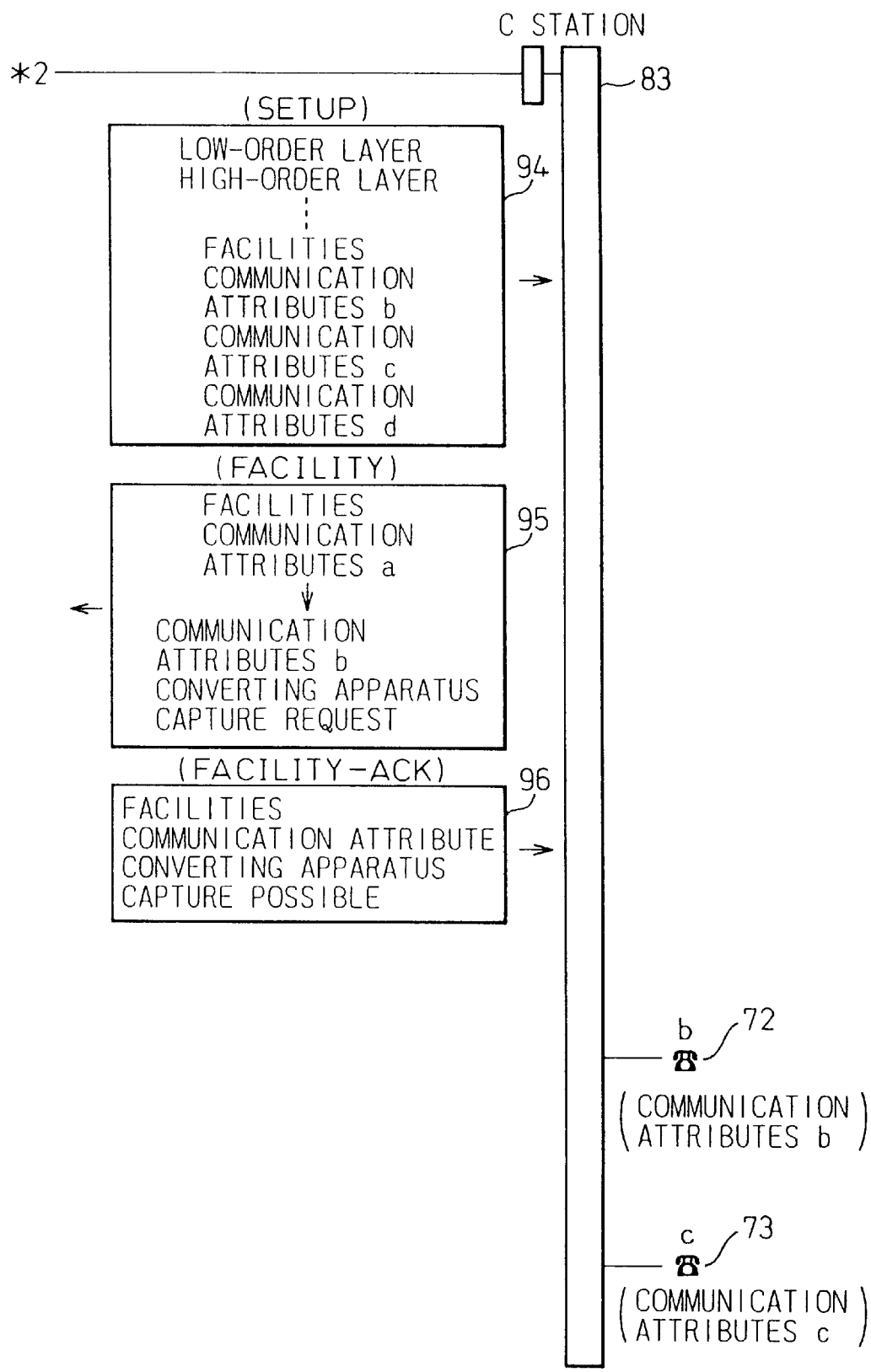

In FIGS. 4A and 4B, in the case in which the terminal a (with communication attributes a) 71 of station A 81 makes a call via station B 82 to terminal b (with communication attributes b) 72 of station C 83, because station A 81 has the communication attribute converting apparatus A (which converts from communication attributes a to communication attributes b) and communication attribute converting apparatus B (which converts communication attributes a to communication attributes c), a SETUP message 91 into which is edited such absolutely required information elements as the SETUP message low-order layer information and high-order layer information and into the facilities information elements of which is edited "communication attributes b" and "communication attributes c" is sent to the station B 82.

At the station B 82, when the above-noted SETUP message 91 is received, because there is, in addition to the communication attribute converting apparatuses A and B, the communication attribute converting apparatus C (which converts the communication attributes a to the communication attributes c), a SETUP message 94 into which has been newly added the communication attributes d is entered into the facilities information elements, and this is relayed to the station C 83. At the station C 83, when this SETUP message 94 is received, the communication attributes of the receiving terminal b 72 are extracted.

In this case, because the communication attributes b exist in the facilities information elements of the received SETUP message 94, the station C 83, rather than using the DISC message, performs a request to capture an apparatus using a FACILITY message 95, for the purpose of converting the communication attributes a of the calling terminal a, which comprise the low-order layer information and the high-order layer information of the SETUP message 94, to the communication attributes of the receiving terminal b. The facilities information elements of the above-noted FACILITY message 95 include the "request to capture apparatus for conversion of communication attributes a to communication attributes b," this message being sent to the station B 82.

At station B, when the above-noted FACILITY message is received, because the facilities information elements thereof include a "request to capture apparatus for conversion of communication attributes a to communication attributes b," a communication attribute converting apparatus is extracted within that station itself. In this example, because the communication attribute converting apparatus A 63 is captured, "communication attribute converting apparatus capture possible" is entered into the facilities information elements of the FACILITY_ACK message, this message being then sent to the station C 83. If the corresponding communication attribute converting apparatus is not captured, or if it is extracted but cannot be captured, the FACILITY message 92 is relayed to the station A.

If the communication attribute converting apparatus A 61 can be captured at station A 81, "communication attribute converting apparatus capturable" is entered into the facilities information elements of the FACILITY_ACK message, this message being sent to the station C 83. If, on the other hand, capture is not possible, "communication attribute converting apparatus capture not possible" is entered into the facilities information elements of the FACILITY_ACK message 93 and this is sent to the station C 83.

At station C 83, when the FACILITY_ACK message 93 from the station B 82 is received, if the facilities information elements thereof is "communication attribute converting apparatus capturable," an ALERT message and a CONN message are sent to the station A 81. If, on the other hand, the facilities information elements are "communication attribute converting apparatus capture not possible," a DISC message is sent to the station A 81.

In the same manner, in the case of terminal a (communication attributes a) 71 of station 81 A calling terminal c (communication attributes c) 73 of station C 83 via station B 82, when a SETUP message is received at station C 83, the communication attributes of terminal c 73 are extracted. Because the facilities information elements of the received SETUP message include "communication attributes c," station C 83 sends to station B 82 a FACILITY message (not shown in the drawing) into the facilities information elements of which is entered "request to capture apparatus for conversion of communication attributes a to communication attributes c," rather than sending a DISC connect message.

At station B 82, when the above-noted FACILITY message is received, because the facilities information elements thereof include "request to capture apparatus for conversion of communication attributes a to communication attributes c," extraction of the corresponding communication attribute converting apparatus is performed. In this example, however, because the apparatus does not exist at station B, the above-noted FACILITY message is relayed as is to the station A 81. At station A 81, this causes the capture of the communication attribute converting apparatus B 62. The processing thereafter is the same as described above, and will not be repeated.

In terms of a different embodiment, an example of the configuration of a network in the case in which a communication attribute converting apparatus is extracted according to the present invention when a disconnect request is made will be described, with reference being made to FIGS. 5A and 5B.

Referring to FIGS. 5A and 5B, in the case in which terminal a (communication attributes a) 71 of station A 81 calls the terminal b (communication attributes b) of station B 82 via the station C 83, when a SETUP message (not shown in the drawing) is received at the station C 83, the communication attributes a of the terminal a 71 are extracted, based on the low-order layer information and high-order layer information of SETUP message.

For this reason, because these are different from the communication attributes b of the receiving terminal b 72, "incompatible terminal attributes" is entered into the cause display of the cause display information elements, which are the absolutely required information elements of the DISC message, by the station C 83, and communication attributes a and communication attributes b are entered into the facilities information elements which are addable, the thus-modified DISC message 99 being then sent to the station B 82.

At the station B, when the above-noted DISC message 99 is received, because there is no communication attribute converting apparatus in that station itself which is capable of converting the communication attributes a to the communication attributes b, the station B relays the DISC message 99 to station A with the same contents. At the station A, when this DISC message is received, the communication attribute converting apparatus A 61, which can convert the communication attributes a to the communication attributes b, is captured, whereby the communication attributes a of the low-order layer information and high-order information of the SETUP message are converted to the communication attributes b, after which this modified SETUP message is sent to the station C 83. As a result, communication is possible between the terminal a 71 of station A 81 the terminal b 72 of the station B 83.

In the case in which terminal a (communication attributes a) 71 of the station A 81 calls terminal c (communication attributes c) 73 of the station C 83, via the station B 82, following a protocol similar to that described above, "incompatible terminal attributes" is entered into the cause display of the cause display information elements, which are absolutely required information elements of the DISC message and the DISC message (not shown in the drawing), into the facilities information elements of which have been entered communication attributes a and communication attributes c, is sent to the station B 82.

At the station B 82, when the above-noted DISC message is received, in this example, the communication attribute converting apparatus B 62, which can convert the communication attributes a to the communication attributes c is extracted and captured, whereby the communication attributes which are the low-order layer information and high-order layer information of the SETUP message are converted from communication attributes a to communication attributes c, this modified SETUP message being resent to station C. As a result, communication between terminal a 71 of station A 81 and terminal c 73 of the station C 83 is possible. In the case in which it is not possible to capture the communication attribute converting apparatus B 62, the DISC message is sent to the station A as is.

In addition, in the case in which terminal (communication attributes a) 71 of the station A 81 calls terminal d (communication attributes d) 74 of station C 83 via the station B 82, at station C 83, following the above-noted protocol, "incompatible terminal attributes" is entered into the cause display of the cause display information elements, which are absolutely required information elements of the DISC message, and a DISC message (not shown in the drawing) into the addable facilities information elements of which are entered communication attributes a and communication attributes d, is sent to station B 82.

At station B 82, when the above-noted DISC message is received, because there is no communication attribute converting apparatus which can convert the communication attributes a to the communication attributes d, the above-noted DISC message is relayed as is to the station A. At station A 81, when the DISC message from station B 82 is received, in the same manner, because there is no communication attribute converting apparatus which can convert the communication attributes a to the communication attributes d, if there is a stored station number which has been pre-established as an alternate route, the communication attributes a and communication attributes d of the facilities information elements of the DISC message received from the station B 82 are entered into the facilities information elements of a new SETUP message, this SETUP message 98 being sent to a station D 84 which is specified as an alternate route by the station number.

At station D 84, when the above-noted SETUP message 98 is received, in this example, the communication attribute converting apparatus C 64, which can convert the communication attributes a to the communication attributes d is extracted and captured, and a SETUP message (not shown in the drawing), the communications attributes of which, which are the low-order layer information and high-order layer information, are converted from communication attributes a to communication attributes d, is sent to the station C 83. In the case in which it is not possible to capture the communication attribute converting apparatus C 64, the received SETUP message 98 is relayed to the station C as is.

At station C 83, when the above-noted SETUP message is received, if the communication attributes, which are the low-order layer information and high-order layer information of the SETUP message are the same as the communication attributes d of the terminal d, an ALERT message and a CONN message are sent to the station A 81 via station D, enabling communication between terminal a 71 of the station A 81 and station B 72 of the station B 83 via station D.

If, on the other hand, the communication attributes indicated by the low-order layer information and the high-order layer information are not the same as the communication attributes d of the terminal d, in the case in which the communication attributes a of the calling terminal a and the communication attributes d of the receiving terminal d exist in the facilities information elements thereof, a DISC message to which no facilities information elements are added is sent to the station A 81.

In this manner, in contrast to the example of FIGS. 4A and 4B, described above, in this example, there is no need for a FACILITY message and a FACILITY_ACK message.

Figure 6:
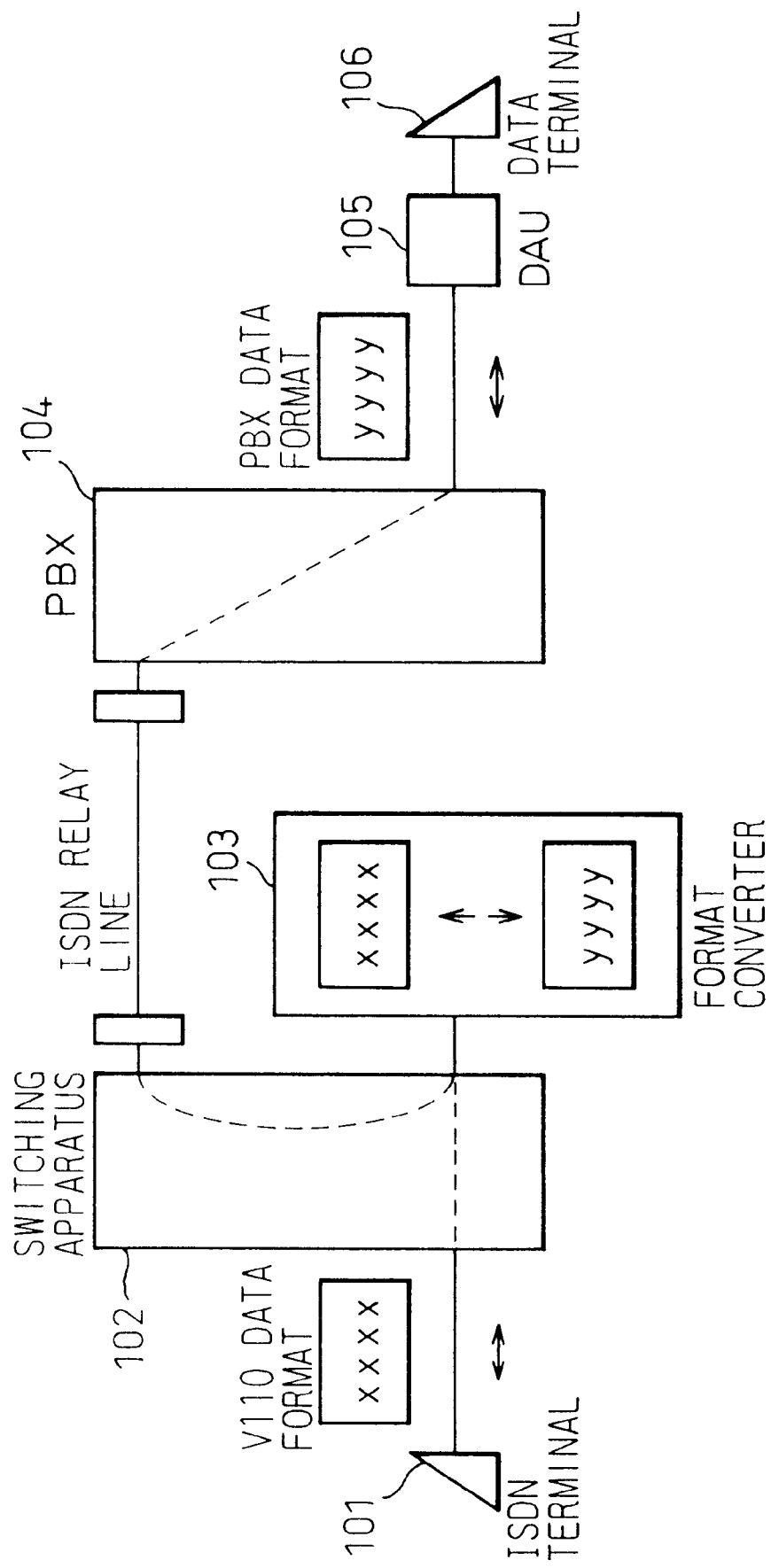
FIG. 6 is a drawing which shows an example of data communication via a communication attribute converting apparatus.

FIG. 6 shows an example of data communication via a communication attribute converting apparatus.

In FIG. 6, a switching apparatus 102 for a station, a PBX or the like, has an ISDN terminal 101 connected in accordance with the V110 (xxxx) communication data format for ISDN terminals. The PBX 104, which has the prescribed communication data format (yyyy) for the system is connected to a general data terminal 106 via a data access unit (DAU) 105 which uses this communication data format (yyyy). A dedicated ISDN multifunction digital telephone or the like (not shown in the drawing) is connected directly without passing through the above-noted data access unit 105.

In this example, a format converter 103 is housed in the switching apparatus 102, and when the ISDN terminal 101 performs communication to the data terminal 105, the above-described protocol of the present invention (capture of the format converter 103 by the switching apparatus 102) is executed. Thereafter, the ISDN terminal 101 outputs data to the switching apparatus 102 in the data format (xxxx), and the V110 data format data is converted at the format converter 103 to the appropriate PBX specification format (yyyy) and sends the data to the PBX 104. At the PBX 104, the received data is sent to the data access unit (DAU) 105 which is connected to the data terminal 106 in the converted data format (yyyy). When response and the like occur from the data terminal 106, it is obvious that the reverse of the above-noted conversion is performed.

Next, bearing in mind the above-described basic operation of the present invention, the basic configuration of an communication attribute converting apparatus automatic capturing apparatus described above in relation to FIGS. 1A and 1B, and the communication sequence diagrams and processing flow diagrams of FIG. 7 through FIG. 27 will be used to describe the present invention in detail.

Figure 7:
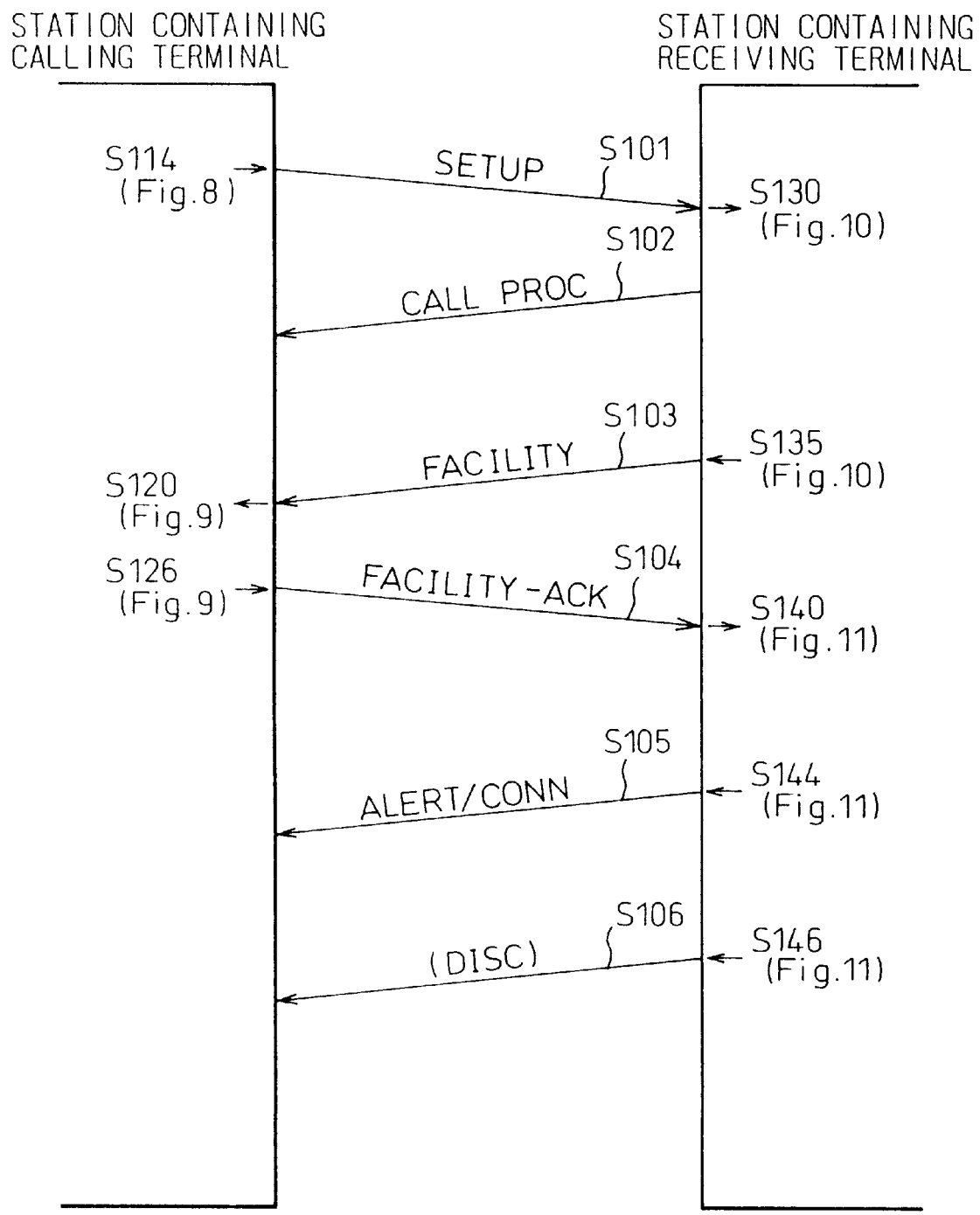
FIG. 7 is a drawing which shows the communication sequence for the first communication mode according to the present invention.

FIG. 7 is a sequence diagram which illustrates the first communication mode of the present invention, this showing the communication sequence between the station that contains the calling terminal and the station that contains the receiving terminal. The description from this point up to and including the third communication mode of the present invention will treat the case in which a communication attribute converting apparatus is captured when a call is set up using a SETUP message and a FACILITY message.

FIG. 8 to FIG. 11 shows an example of the processing flow of various messages shown in FIG. 7.

Figure 8:
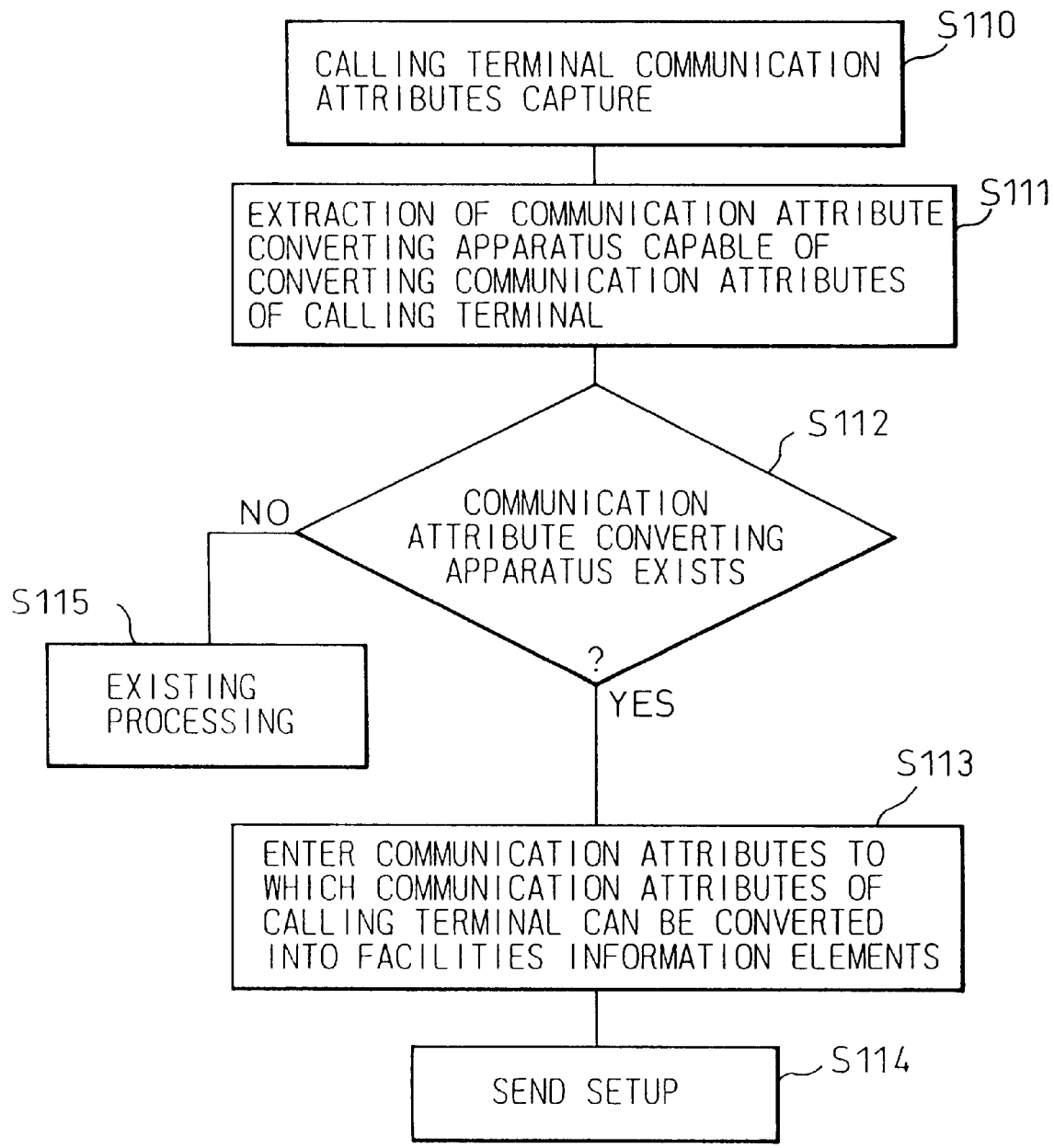
FIG. 8 is flow diagram which shows the processing flow (1) for messages shown in FIG. 7.

In a station which contains a calling terminal having the configuration shown in FIGS. 1A and 1B, in the case in which a terminal 11 calls an ISDN network via a channel (corresponding to various trunk equipment), the terminal data management control section 44 extracts the communication attributes of the terminal 11 from the terminal data 51 of the calling terminal (S110 in FIG. 8), and the communication attribute converting apparatus management control apparatus 45, based on this, performs extraction of a converting apparatus which can perform conversion of communication attributes from the communication attribute converting apparatus data 52 which is managing the data of the communication attribute converting apparatus 6 (S111 in FIG. 8).

If there is no above-noted communication attribute converting apparatus 6, previously existing processing is performed (S115 in FIG. 8), and if communication attribute converting apparatus 6 exists, at message transmitting control section 41, communication attributes of calling terminal 11 which can be converted are entered into the facilities information elements, which are information elements used in transfer of control information between networks (S113 in FIG. 8), the channel 22 is captured by the channel capture control section 47, and the SETUP message is sent (S114 in FIG. 8 and S101 in FIG. 7).

Figure 10:
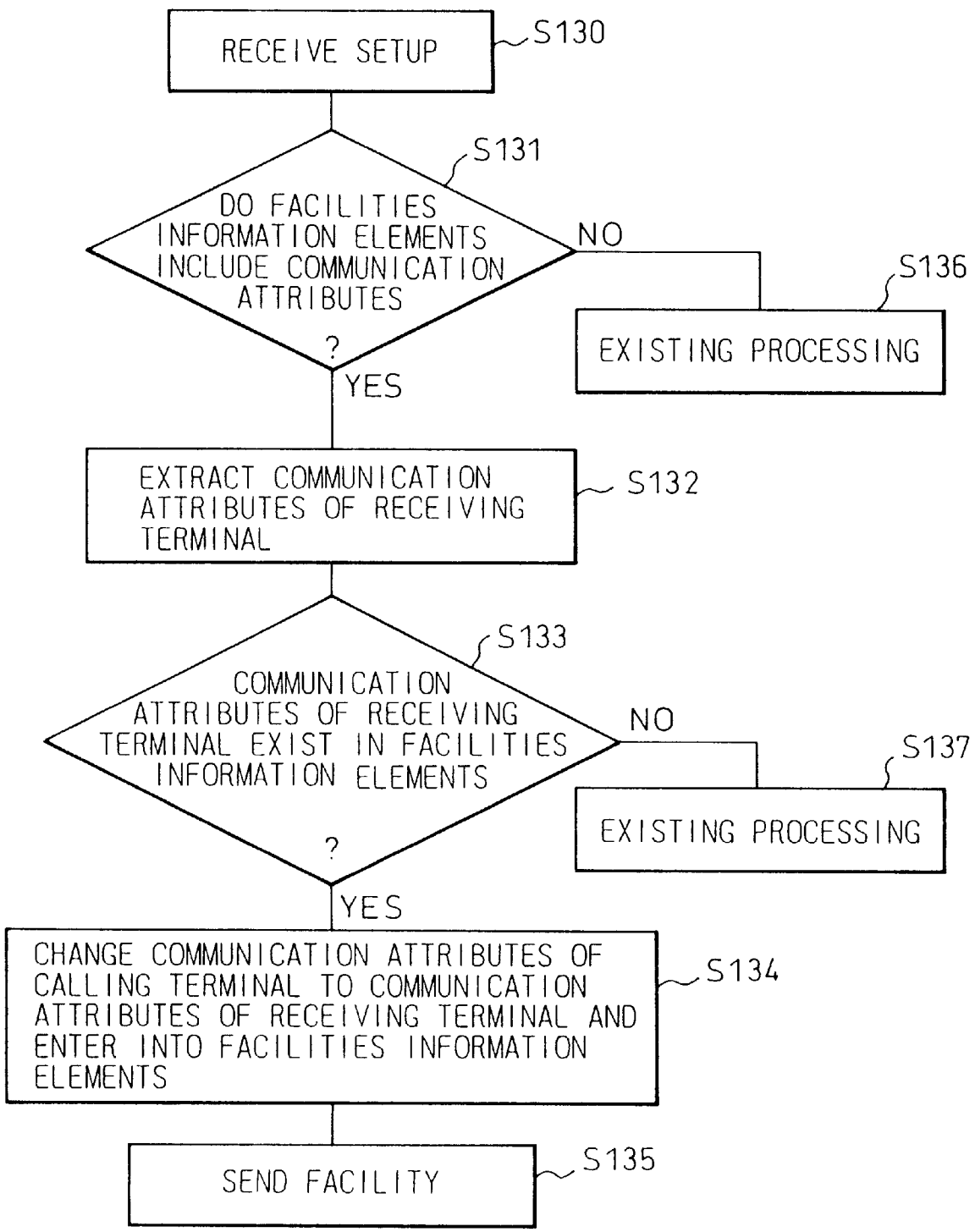
FIG. 10 is flow diagram which shows the processing flow (3) for messages shown in FIG. 7.

In the same manner, at the station which contains the receiving terminal having the configuration shown in FIGS. 1A and 1B, when the above-noted SETUP message is received via channel 21 (S130 in FIG. 10), at the message receiving control section 43 a check is made with regard to whether the facilities information elements have communication attributes which can be converted to the communication attributes of the calling terminal (S131 in FIG. 10). If they do not, existing processing is performed. However, if they do, at the terminal data management control section 44, the communication attributes of the receiving terminal 12 are extracted from the terminal data 51 (S136 and S132 in FIG. 10).

Next, discrimination is made of whether the communication attributes of the receiving terminal 12 are the communication attributes which are included in the facilities information elements received (S133 in FIG. 10), and if they are not, existing processing is performed. If however they are, at the message transmitting control section 41 a communication attribute converting apparatus capture request for a communication attribute converting apparatus that can convert the communication attributes of the receiving terminal is entered into the facilities information elements (S137 and S134 in FIG. 10). Then a FACILITY message for supplementary service having these facilities information elements added to it is sent (S135 in FIG. 10 and S103 in FIG. 7).

Figure 9:
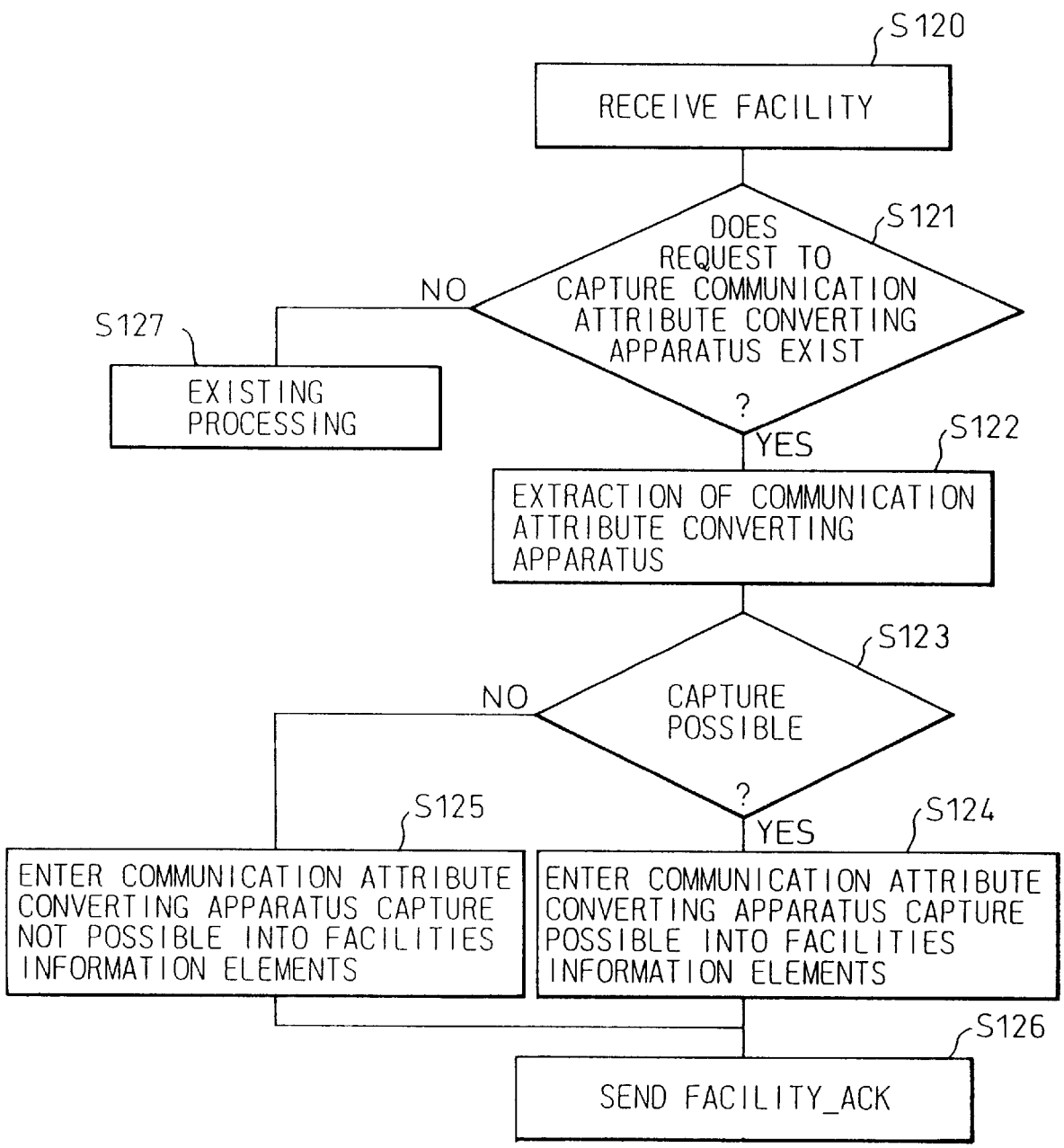
FIG. 9 is flow diagram which shows the processing flow (2) for messages shown in FIG. 7.

When the above-noted FACILITY message is received at the station which contains the calling terminal (S120 in FIG. 9), at the message receiving control section 43, a judgment is made as to whether or not a communication attribute converting apparatus capture request exists in the facilities information elements thereof (S121 in FIG. 9). If it does not exist, existing processing is performed. If it does exist, at the communication attribute converting apparatus capture control section 46, the communication attribute converting apparatus 6 which converts the communication attributes of the calling terminal to the communication attributes of the receiving terminal is extracted (S127 and S122 in FIG. 9).

In the case in which capture is possible, at the message transmitting control section 41 a "communication attribute converting apparatus capture possible" is entered into the facilities information elements. If however capture is not possible, at the message transmitting control section 41 "communication attribute converting apparatus capture not possible" is entered into the facilities information elements (S124 and S125 in FIG. 9), after which the FACILITY_ACK message, which is a supplementary service message, to which is added these information elements, is returned (S126 in FIG. 9 and S104 in FIG. 7).

Figure 11:
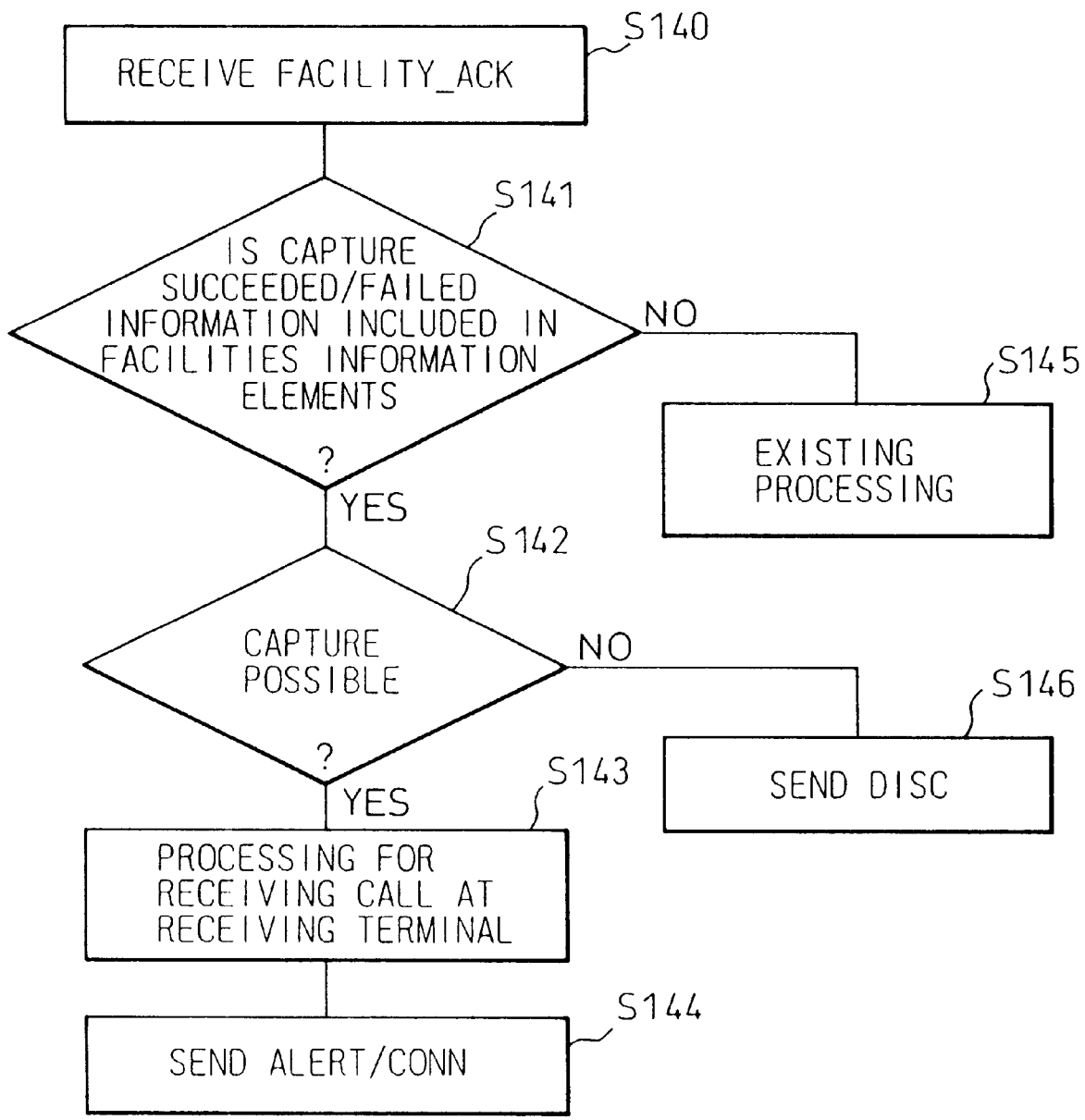
FIG. 11 is flow diagram which shows the processing flow (4) for messages shown in FIG. 7.

When the above-noted FACILITY_ACK message is received at the station which contains the receiving terminal (S140 in FIG. 11), if there is no information as to whether or not capture of a communication attribute converting apparatus is possible, the message receiving control section 43 performs existing processing (S145 in FIG. 11). If however there is such information, if capture is possible, the call is caused, by the terminal receiving control section 48, to be received at the receiving terminal 12 (S143 in FIG. 11). If however capture is not possible, the message transmitting control section 41 sends a DISC connect message (S146 in FIG. 11 and S106 in FIG. 7).

Figure 12:
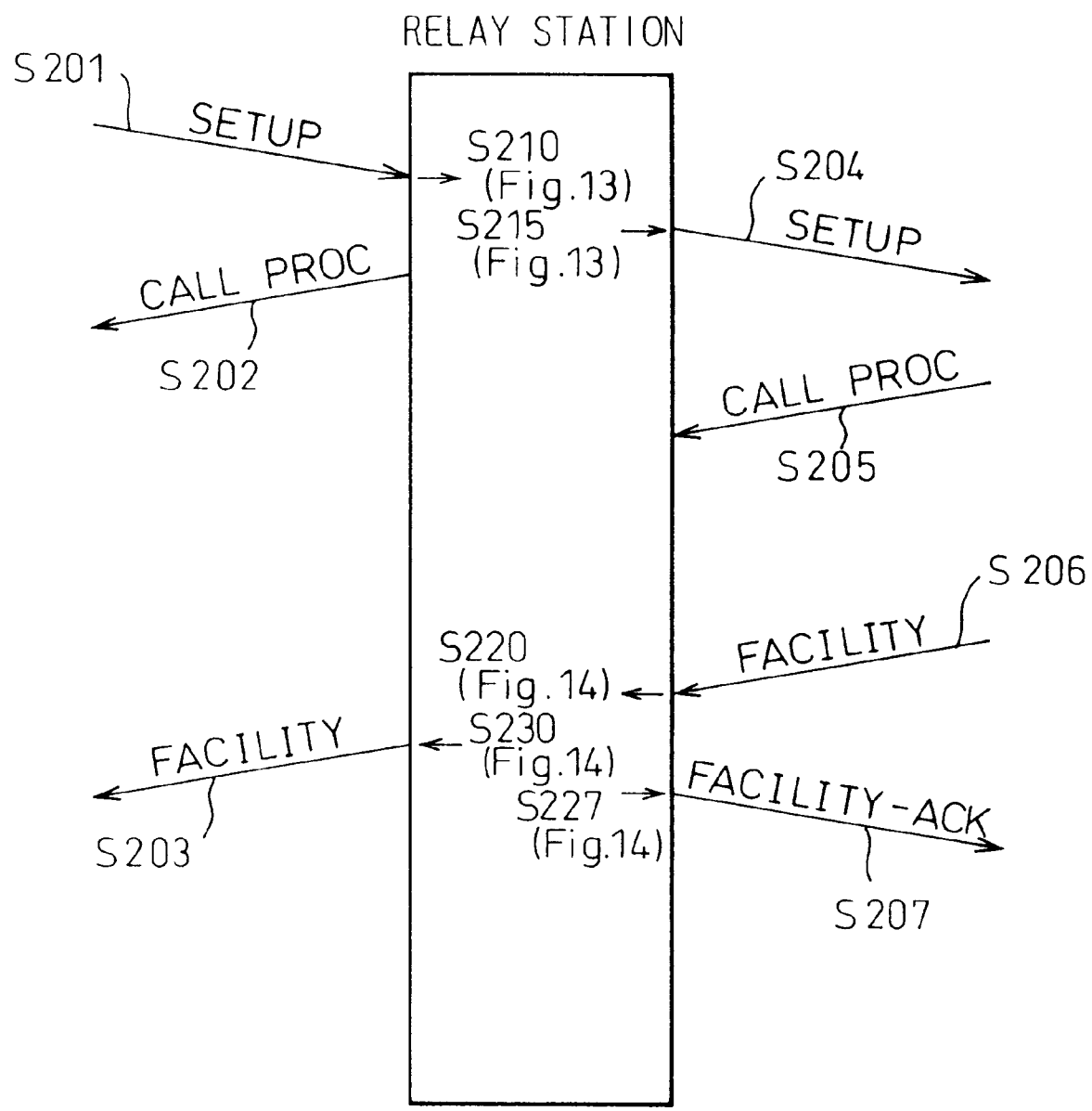
FIG. 12 is a drawing which shows the communication sequence for the second communication mode according to the present invention.

FIG. 12 illustrates the communication sequence for the second communication mode according to the present invention, for the case in which there is a relay station between the station containing the calling terminal and the station containing the receiving terminal.

Figure 13:
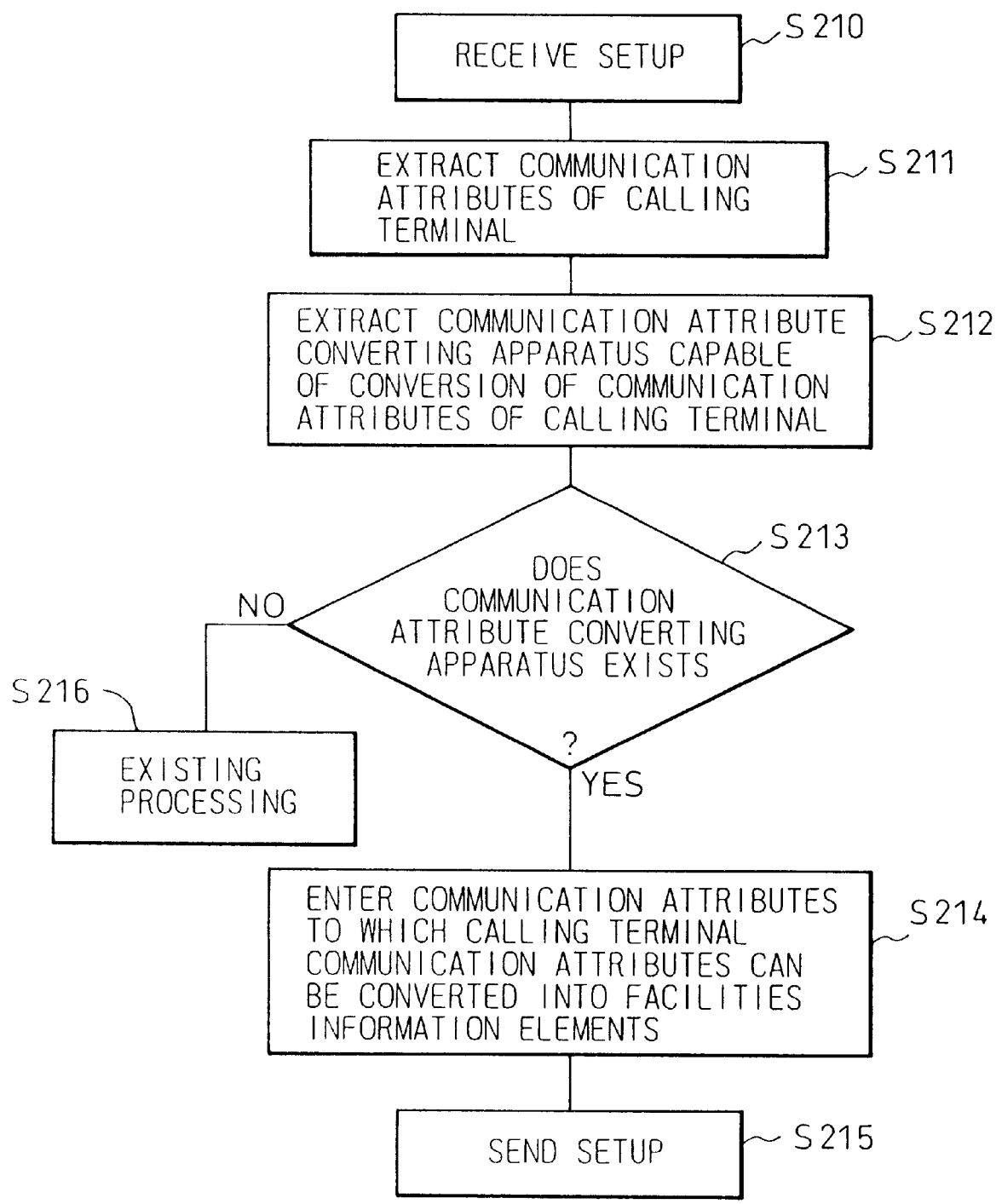
FIG. 13 is flow diagram which shows the processing flow (1) for messages shown in FIG. 12.
Figure 14:
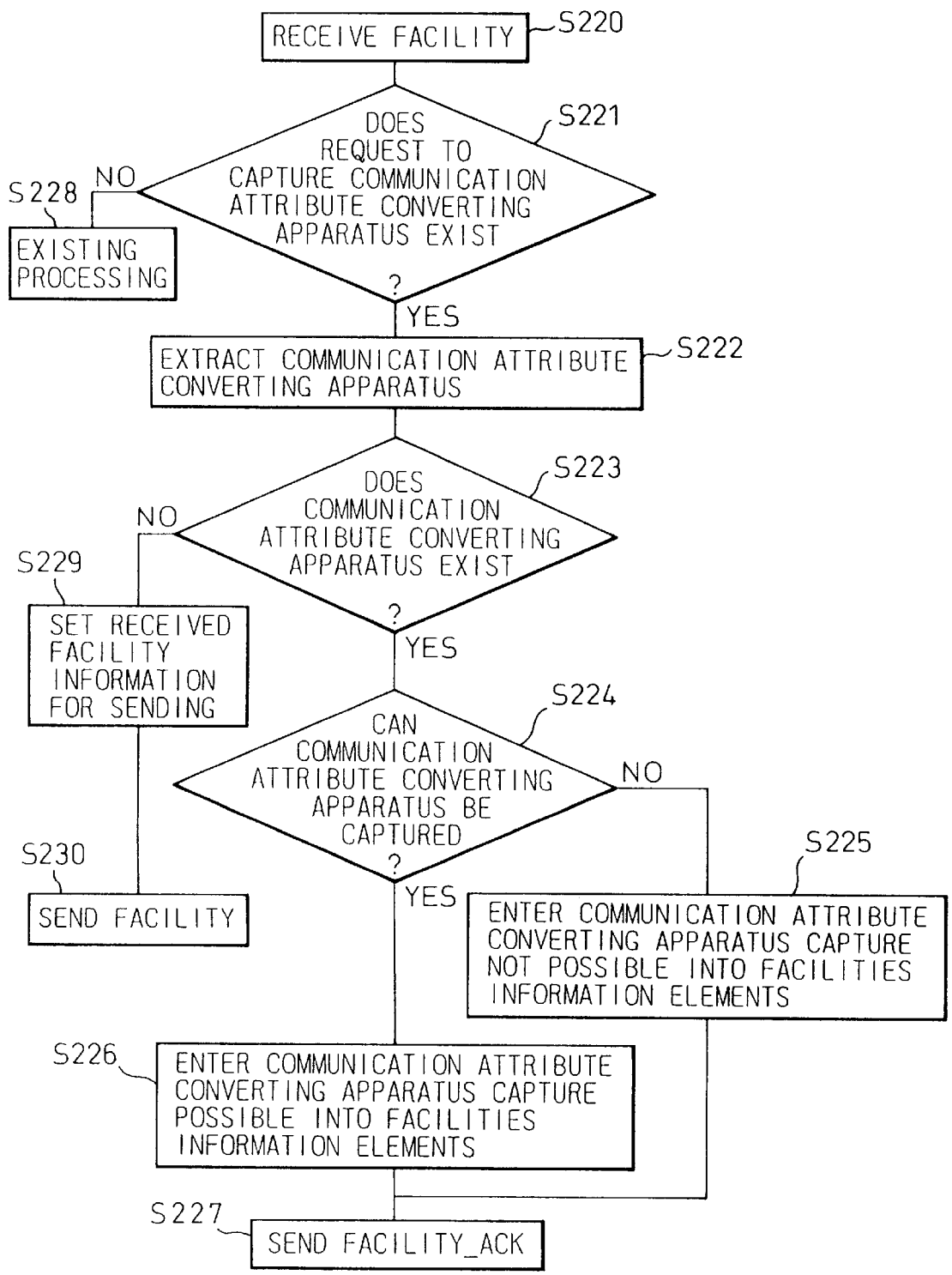
FIG. 14 is flow diagram which shows the processing flow (2) for messages shown in FIG. 12.

FIG. 13 and FIG. 14 show the example of the processing flow of the messages shown in FIG. 12.

At a relay station having the configuration shown in FIGS. 1A and 1B, when a SETUP message is received via channel 21 (S210 in FIG. 13 and S201 in FIG. 12), the communication attributes of the calling terminal are extracted from the low-order layer information and high-order layer information of the SETUP message received from the message receiving control section 43 (S211 in FIG. 13) and the communication attribute converting apparatus management control apparatus 45 performs extraction of a converting apparatus that can convert the communication attributes of the calling terminal from the communication attribute converting apparatus data 52 (S212 in FIG. 13).

In the case in which there is no above-noted converting apparatus, existing processing is performed. If there is such a converting apparatus, the message relaying control section 42 adds the communication attributes that can be converted from the communication attributes of the calling terminal to the facilities information elements (S216 and S214 in FIG. 13), the channel 22 is captured by the channel capture control section 47, and the SETUP message is sent (S215 in FIG. 13 and S204 in FIG. 12).

When the relay station receives the FACILITY message (S220 in FIG. 14 and S206 in FIG. 12), the message receiving control section 43 performs existing processing if the facilities information elements thereof do not have a communication attribute converting apparatus capture request. If there is a communication attribute converting apparatus capture request, the communication attribute converting apparatus management control apparatus 45 performs extraction of a communication attribute converting apparatus 6 which converts the communication attributes of the calling terminal to the communication attributes of the receiving terminal from the communication attribute converting apparatus data 52 (S228 and S222 in FIG. 14).

In the case in which the above-noted communication attribute converting apparatus exists, the communication attribute converting apparatus 6 is captured by the communication attribute converting apparatus capture control section 46 (S224 in FIG. 14), and if this capture is possible, the communication attribute converting apparatus capture possible information is entered into the facilities information elements by the message transmitting control section 41 (S226 in FIG. 14). If, on the other hand, the capture is not possible, the message transmitting control section 41 enters the communication attribute converting apparatus capture not possible information into the facilities information elements (S225 in FIG. 14). In either case the FACILITY_ACK message is returned (S227 in FIG. 14 and S207 in FIG. 12).

In the case in which there is no communication attribute converting apparatus, at the message relaying control section 42, the FACILITY message information for the sending FACILITY message is set as is (S229 in FIG. 14), and the message transmitting control section 41 relays the FACILITY message (S230 if FIG. 14 and S203 in FIG. 12).

Figure 15:
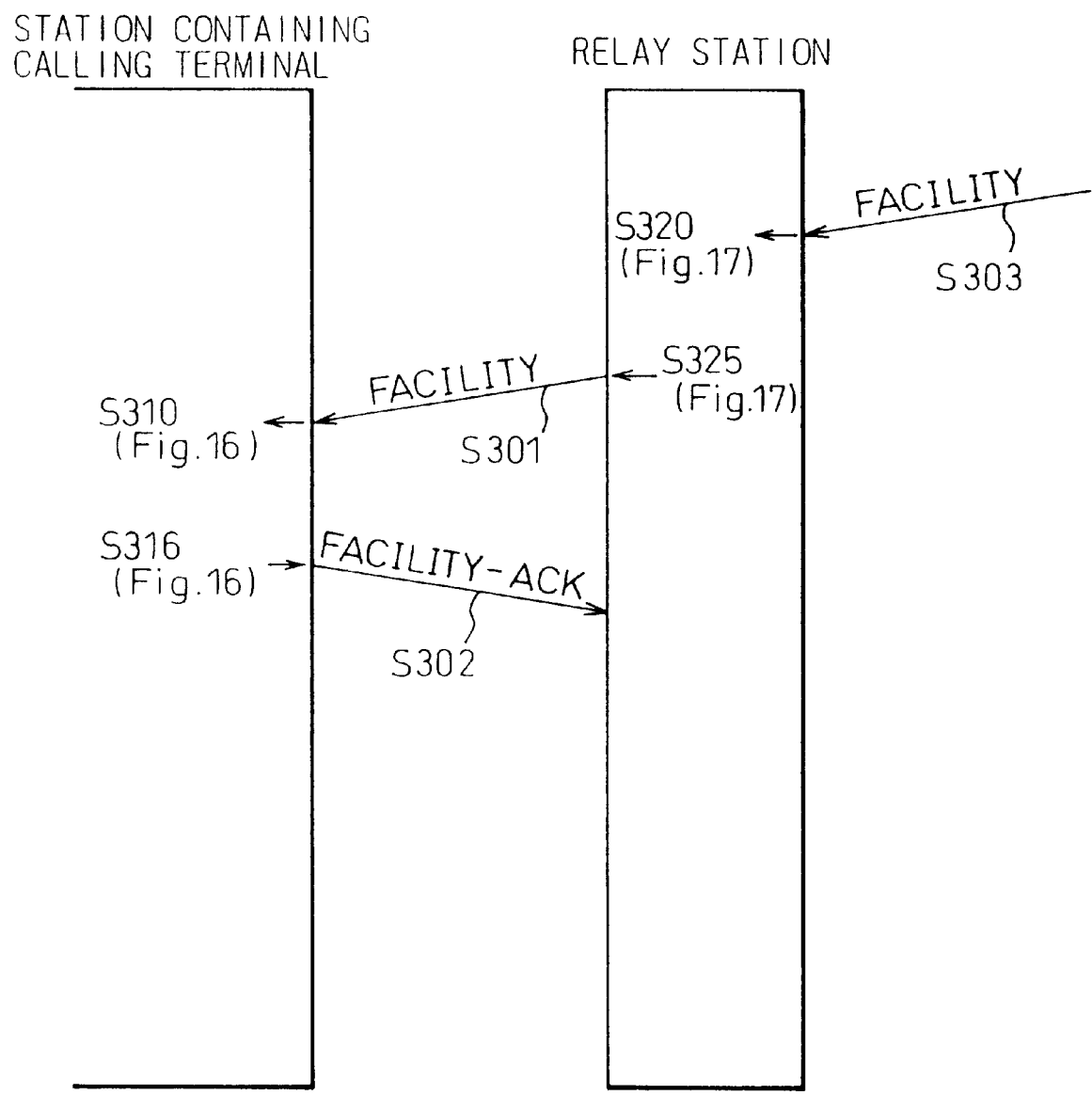
FIG. 15 is a drawing which shows the communication sequence for the third communication mode according to the present invention.

FIG. 15 illustrates the communication sequence for the third communication mode according to the present invention, which is the communication sequence between the station which contains the calling terminal and the relay station.

Figure 16:
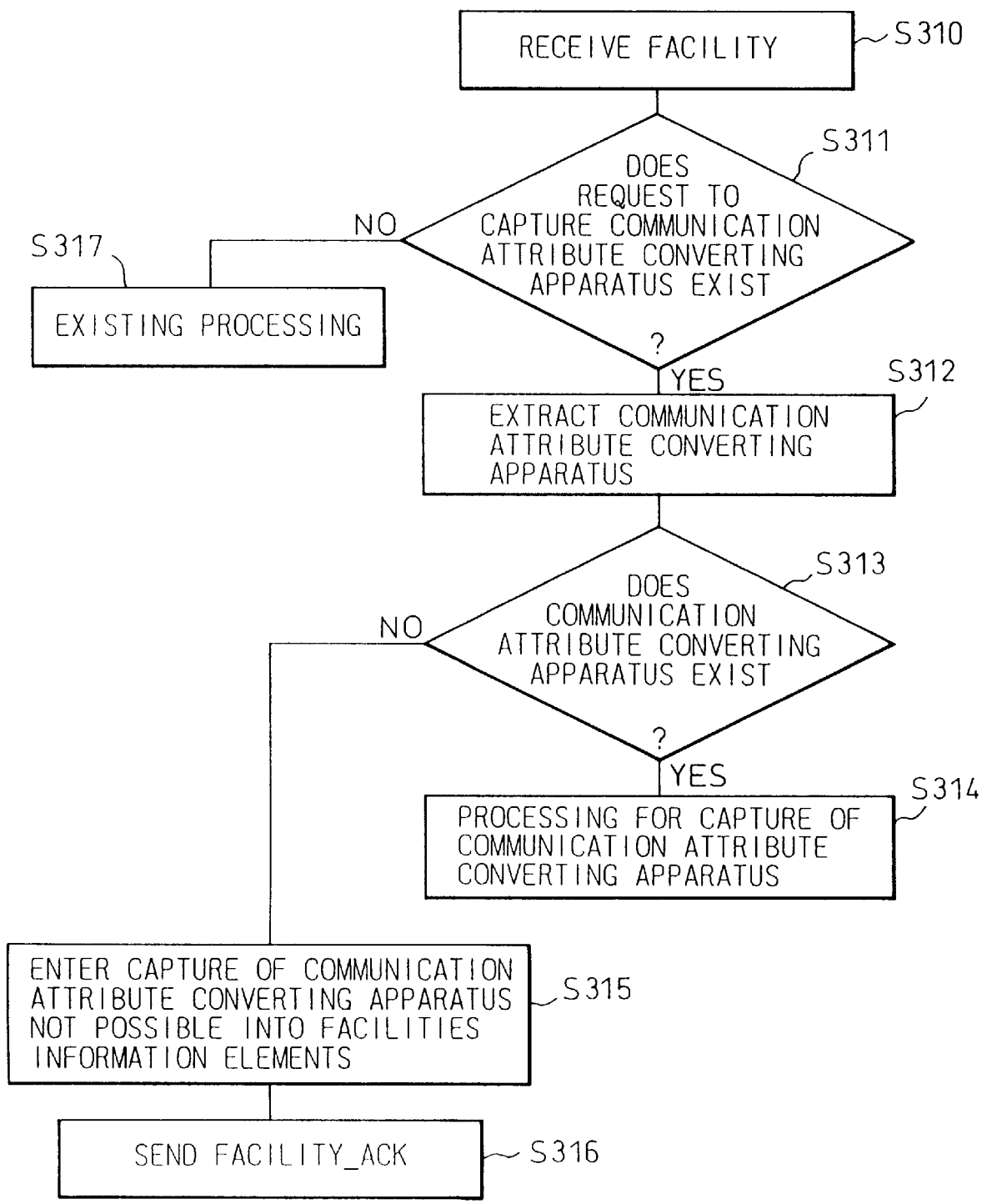
FIG. 16 is flow diagram which shows the processing flow (1) for messages shown in FIG. 15.
Figure 17:
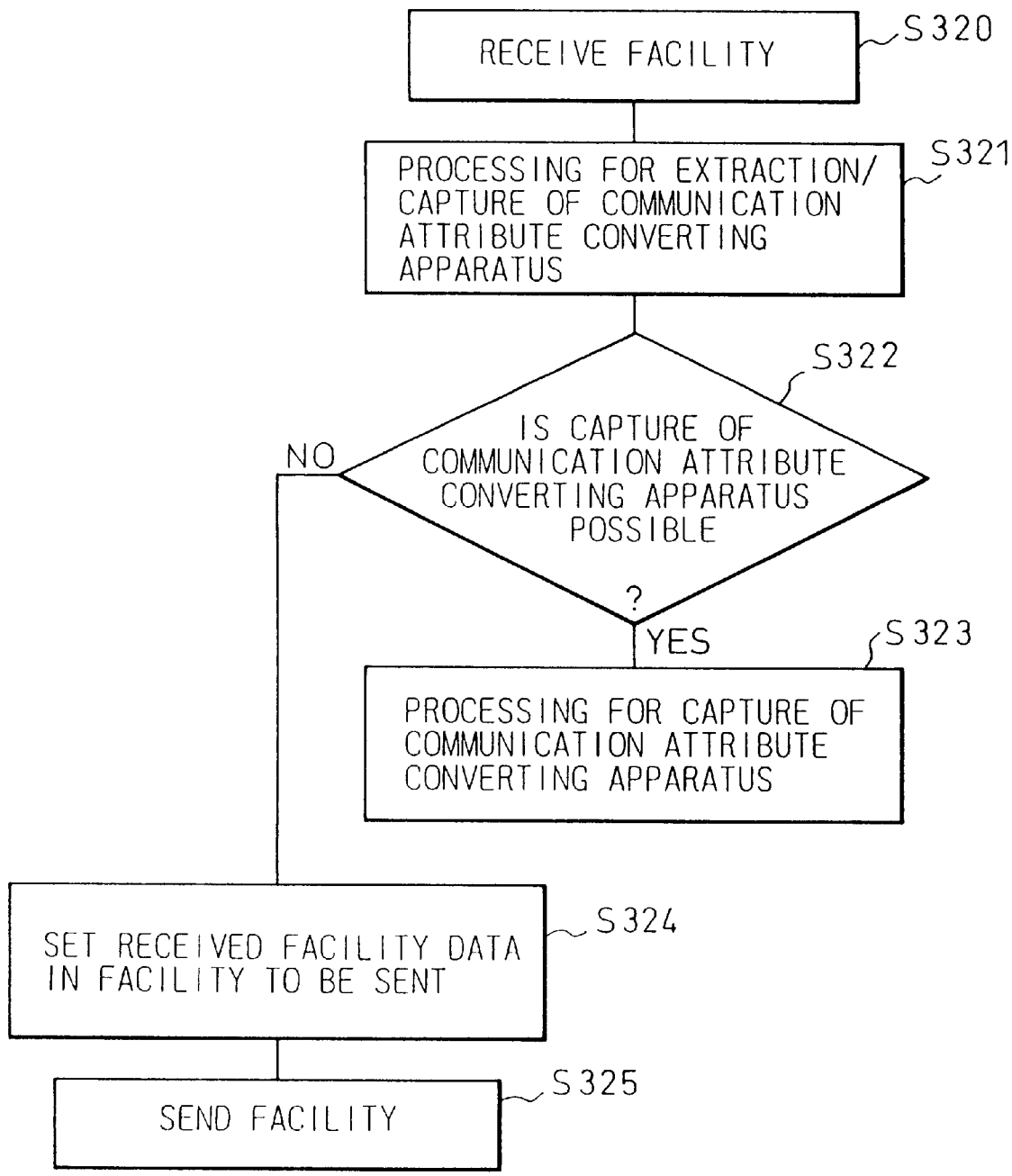
FIG. 17 is flow diagram which shows the processing flow (2) for messages shown in FIG. 15.

FIG. 16 and FIG. 17 show the example of the processing flow of the messages shown in FIG. 15.

At a relay station having the configuration shown in FIGS. 1A and 1B, when a FACILITY message is received (S320 in FIG. 17 and S303 in FIG. 15), the communication attribute converting apparatus extraction and capture processing (S321) in FIG. 17 are the same as already described with regard to steps S221 through S223 and S228 through S230 in FIG. 14. The communication attribute converting apparatus capture processing in FIG. 17 (S322 and S323) is the same as the processing in steps S224, S226 and 227 in FIG. 14.

The difference between the two is that in the case in FIG. 14, even in the case in which it is not possible to capture a communication attribute converting apparatus, the FACILITY_ACK message is returned (S225 in FIG. 14), whereas in the case in FIG. 17, in the case in which capture of the communication attribute converting apparatus is not possible, the FACILITY message information received at the message transmitting control section 41 is set as is into a FACILITY message (S322 and S424), the message transmitting control section 41 relaying the FACILITY message (S325 in FIG. 17 and S301 in FIG. 15).

When a station containing the calling terminal and having the configuration shown in FIGS. 1A and 1B receives the above-noted FACILITY message (S310 in FIG. 16 and 301 in FIG. 15), in the case in which there is no communication attribute converting apparatus request in the facilities information elements received at the message receiving control section 43, existing processing is performed. If however there is a communication attribute converting apparatus request, the communication attribute converting apparatus management control apparatus 45 extracts a communication attribute converting apparatus 6 that converts the communication attributes of the calling terminal to the communication attributes of the receiving terminal from the communication attribute converting apparatus data 52 (S317 and S317 in FIG. 16).

In the case in which there is a communication attribute converting apparatus, the same processing as in steps S123 through S126 is performed to extract and capture the communication attribute converting apparatus (S314). At this point if there is no communication attribute converting apparatus the message transmitting control section 41 returns a FACILITY_ACK message into the facilities information elements of which has been entered "communication attribute converting apparatus capture not possible" information (S315 and S316 in FIG. 16 and 302 in FIG. 15).

Figure 18:
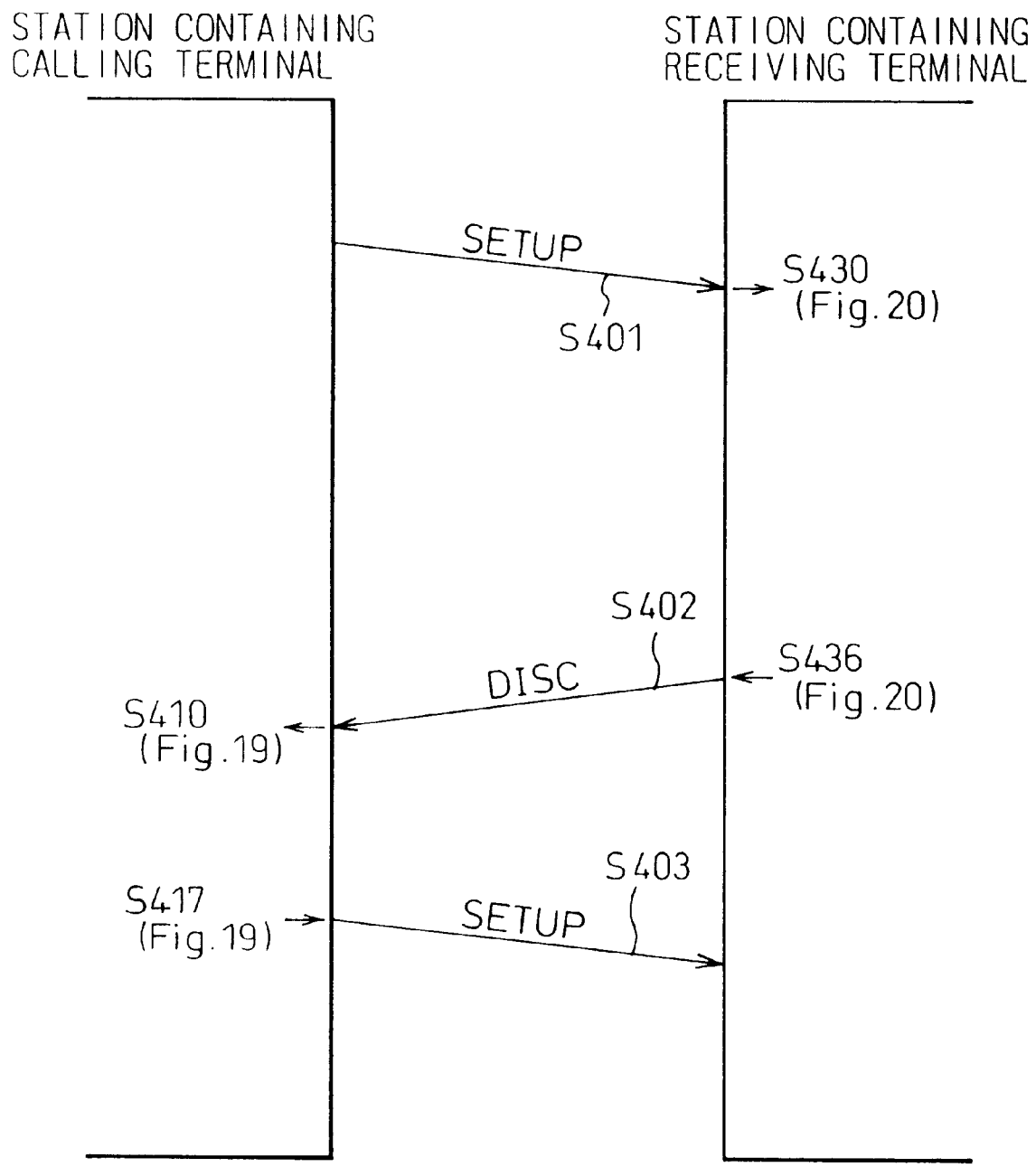
FIG. 18 is a drawing which shows the communication sequence for the fourth communication mode according to the present invention.

FIG. 18 is the communication sequence of the fourth communication mode according to the present invention, which is the communication sequence between a station which contains the calling terminal and the station which contains the receiving terminal. What follows is a description of the extraction of a communication attribute converting apparatus when a disconnect request is made by a DISC message.

Figure 19:
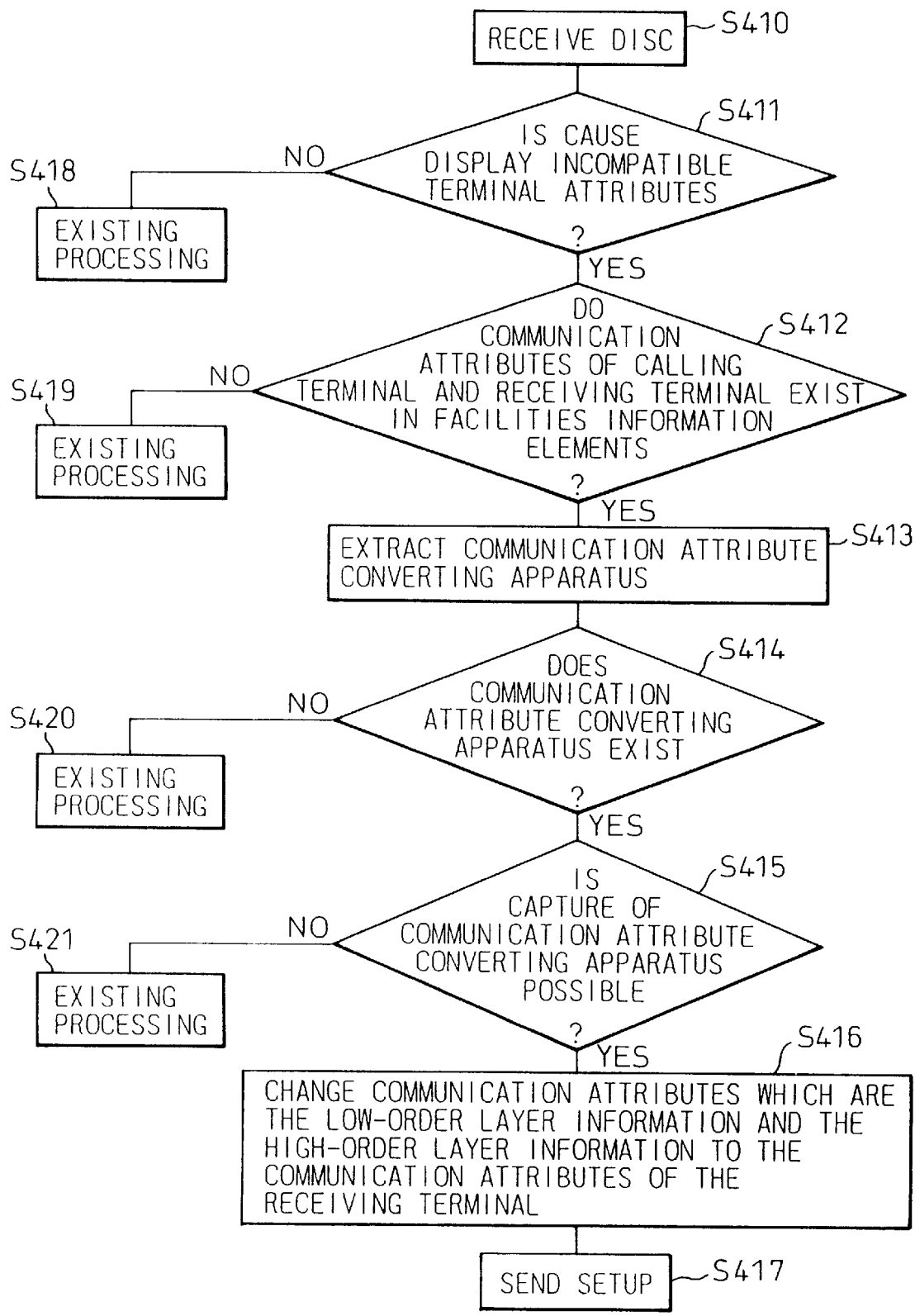
FIG. 19 is flow diagram which shows the processing flow (1) for messages shown in FIG. 18.
Figure 20:
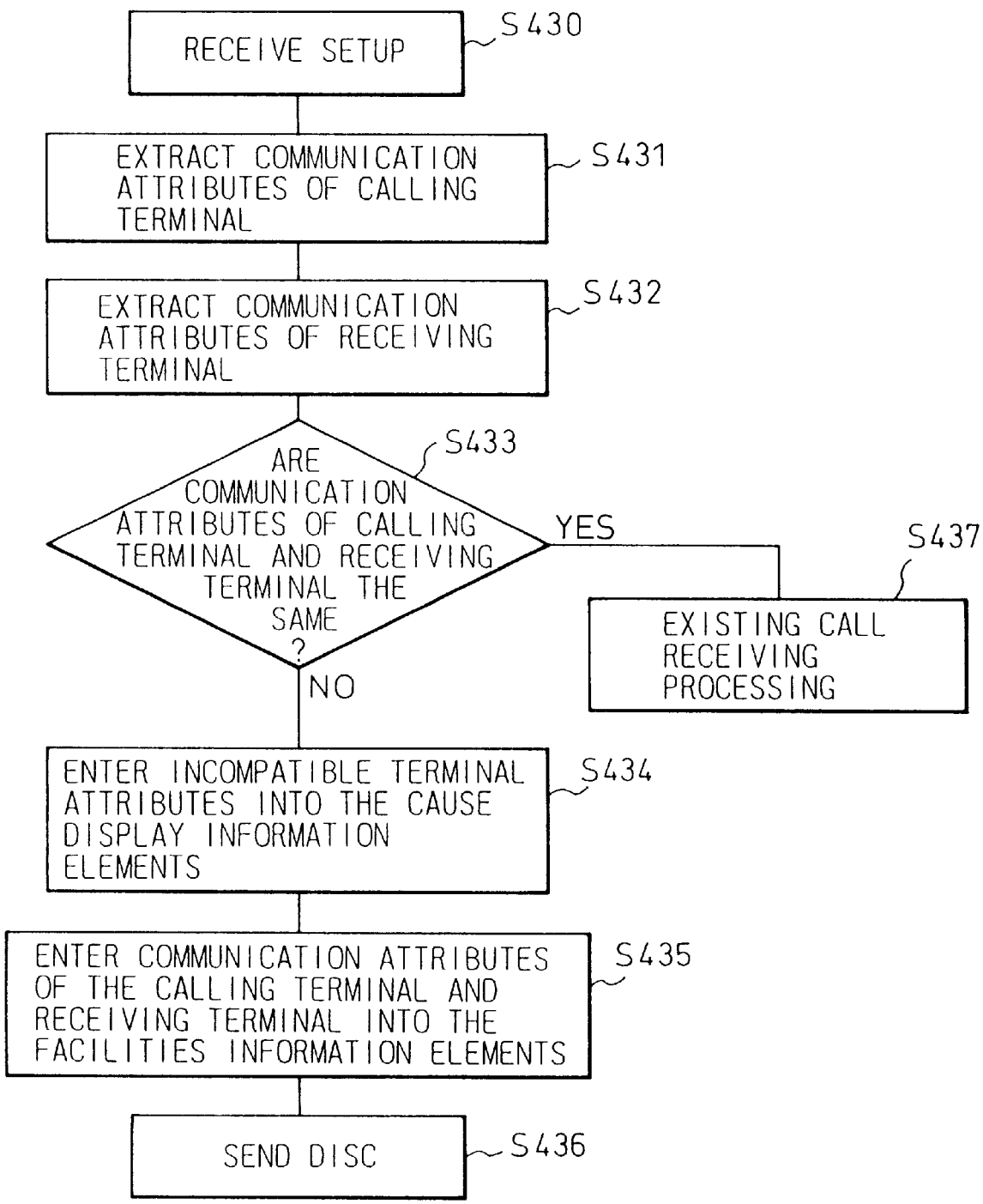
FIG. 20 is flow diagram which shows the processing flow (2) for messages shown in FIG. 18.

FIG. 19 and FIG. 20 show the example of the processing flow for the messages which are shown in FIG. 18.

At a station containing the receiving terminal and which has a configuration such as shown in FIGS. 1A and 1B, when a SETUP message is received via channel 21 (S430 in FIG. 20 and S401 in FIG. 18), the message receiving control section 43 extracts the communication attributes of the calling terminal from the low-order layer information and the high-order layer information of the SETUP message (S431 in FIG. 20). The terminal data management control section 44 extracts the communication attributes from the terminal data 51 of the receiving terminal (S432 in FIG. 20) and in the case in which there is agreement between the communication attributes of the calling terminal and the communication attributes of the receiving terminal, existing processing is performed (S437 in FIG. 20).

If these do not agree however the message transmitting control section 41 enters "incompatible terminal attributes" into the cause display information elements of the DISC message and, after also entering the communication attributes of the calling terminal into these facilities information elements (S434 and S435 in FIG. 20) returns this DISC message (S436 in FIG. 20 and S402 in FIG. 18).

At a station containing the calling terminal and having the configuration shown in FIGS. 1A and 1B, when the above-noted DISC message is received (S410 in FIG. 19), in the case in which the cause display of the cause display information elements of the DISC message is not "incompatible terminal attributes," the message receiving control section 43 performs existing processing (S411 and S418 in FIG. 19).

If on the other hand the cause display is "incompatible terminal attributes," a judgment is made with regard to the existence of the communication attributes of the calling terminal and the receiving terminal in the received facilities information elements (S412 in FIG. 19), and if these do not exist, existing processing is performed (S419 in FIG. 19). If these communication attributes exist, the communication attribute converting apparatus management control apparatus 45 extracts a communication attribute converting apparatus that converts the communication attributes of the calling terminal to the communication attributes of the receiving terminal, based on the communication attribute converting apparatus data 52 (S413 in FIG. 19).

If there is no communication attribute converting apparatus, existing processing is performed (S420 in FIG. 19), but if there is a communication attribute converting apparatus the communication attribute converting apparatus capture control section 46 attempts to capture the communication attribute converting apparatus (S415 in FIG. 19). If this capture does not succeed, existing processing is performed (S421 in FIG. 19). If the capture is successful, however, the communication attributes of the low-order layer information and the high-order layer information of the calling terminal are converted to the communication attributes of the receiving terminal at the message transmitting control section 41 in a SETUP message (S416 in FIG. 19), the channel capture control section 47 capturing the channel 22, at which point the above-noted SETUP message is sent to the station containing the receiving terminal (S417 in FIG. 19 and S403 in FIG. 18).

Figure 21:
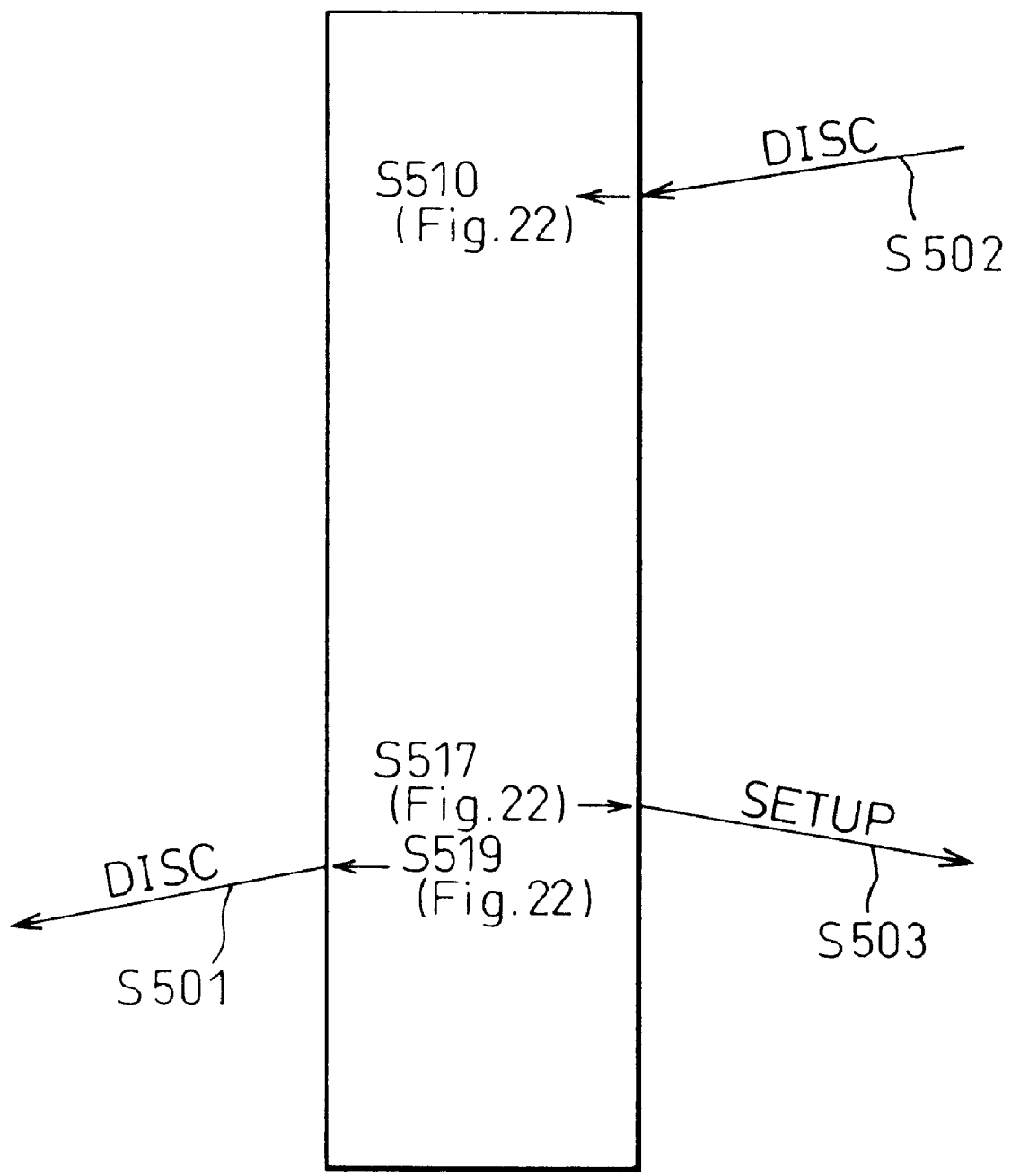
FIG. 21 is a drawing which shows the communication sequence for the fifth communication mode according to the present invention.

FIG. 21 illustrates the communication sequence of the fifth communication mode according to the present invention, this being the communication sequence at a relay station disposed between the station containing the calling terminal and the station containing the receiving terminal.

Figure 22:
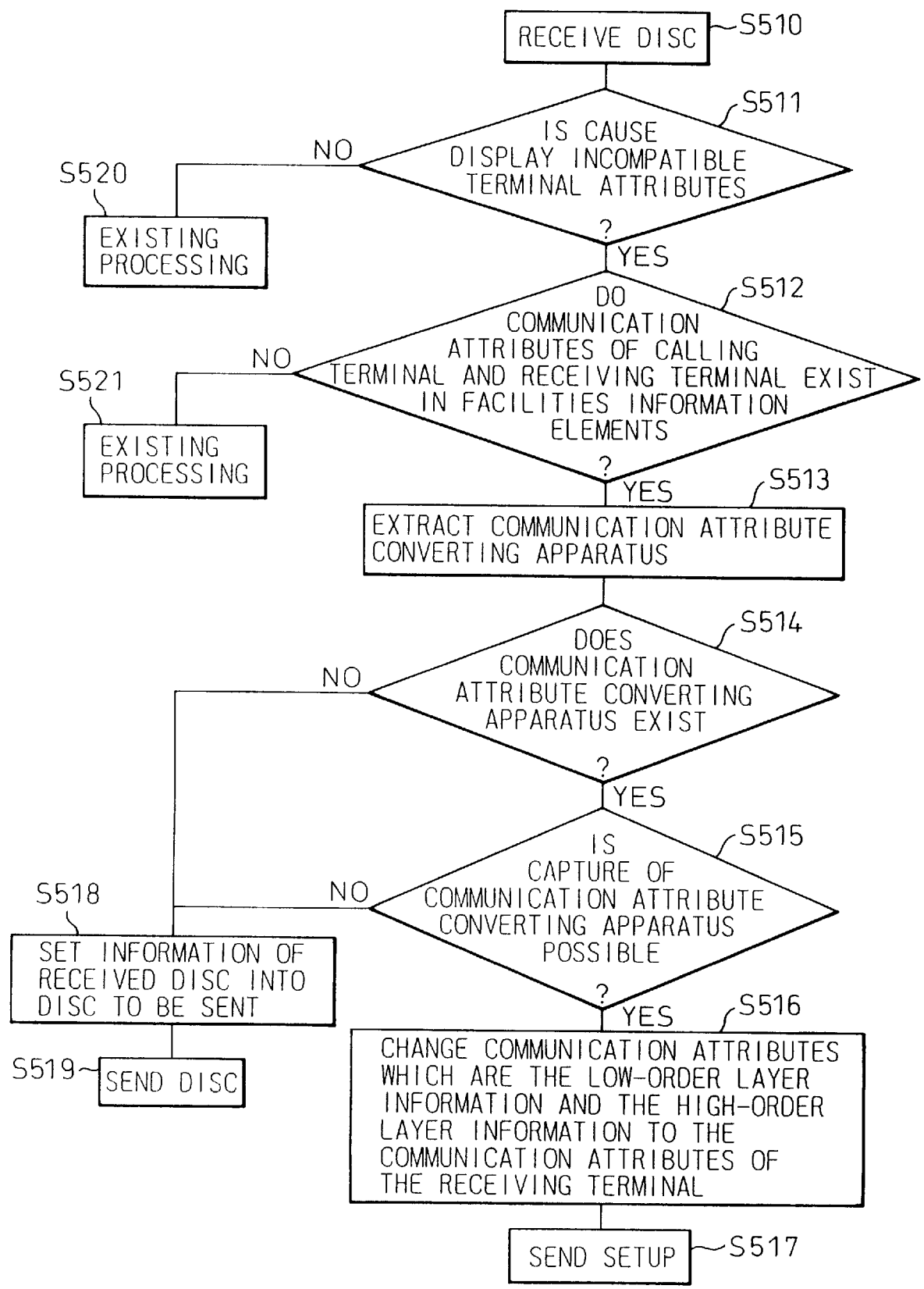
FIG. 22 is flow diagram which shows the processing flow for messages shown in FIG. 21.

FIG. 22 shows an example of the processing flow of the messages shown in FIG. 21.

At a relay station having the configuration shown in FIGS. 1A and 1B, when receiving a DISC message (S510 in FIG. 22 and S502 in FIG. 21), the message receiving control section 43 performs existing processing in the case in which the cause display information elements of the DISC message is not "incompatible terminal attributes" (S520 in FIG. 22). If the cause display however is "incompatible terminal attributes," and the facilities information elements do not include the communication attributes of the calling terminal and the receiving terminal, existing processing is performed (S421 in FIG. 22). If these communication attributes are included in the facilities information elements, however, the communication attribute converting apparatus management control apparatus 45 performs extraction from the communication attribute converting apparatus data 52 of a communication attribute converting apparatus that converts the communication attributes of the calling terminal to the communication attributes of the receiving terminal. (S512 and S513 in FIG. 22).

In the case in which there is a communication attribute converting apparatus, the communication attribute converting apparatus capture control section 46 captures the communication attribute converting apparatus. If the capture has succeeded, the message transmitting control section 41 converts the communication attributes of the low-order layer information and high-order layer information of the calling terminal to the communication attributes of the receiving terminal (S514 through S516 in FIG. 22), these are added to the SETUP message and the SETUP message is sent to the station containing the receiving terminal by the channel capture control section 47 via the channel 22 (S515 in FIG. 22 and S503 in FIG. 21).

If there is no communication attribute converting apparatus, or the communication attribute converting apparatus could not be captured, the message relaying control section 42 sets the DISC message data it received, as is, in the DISC message (S518 in FIG. 22), and the message transmitting control section 41 sends this DISC message (S519 in FIG. 22 and S501 in FIG. 21).

Figure 23:
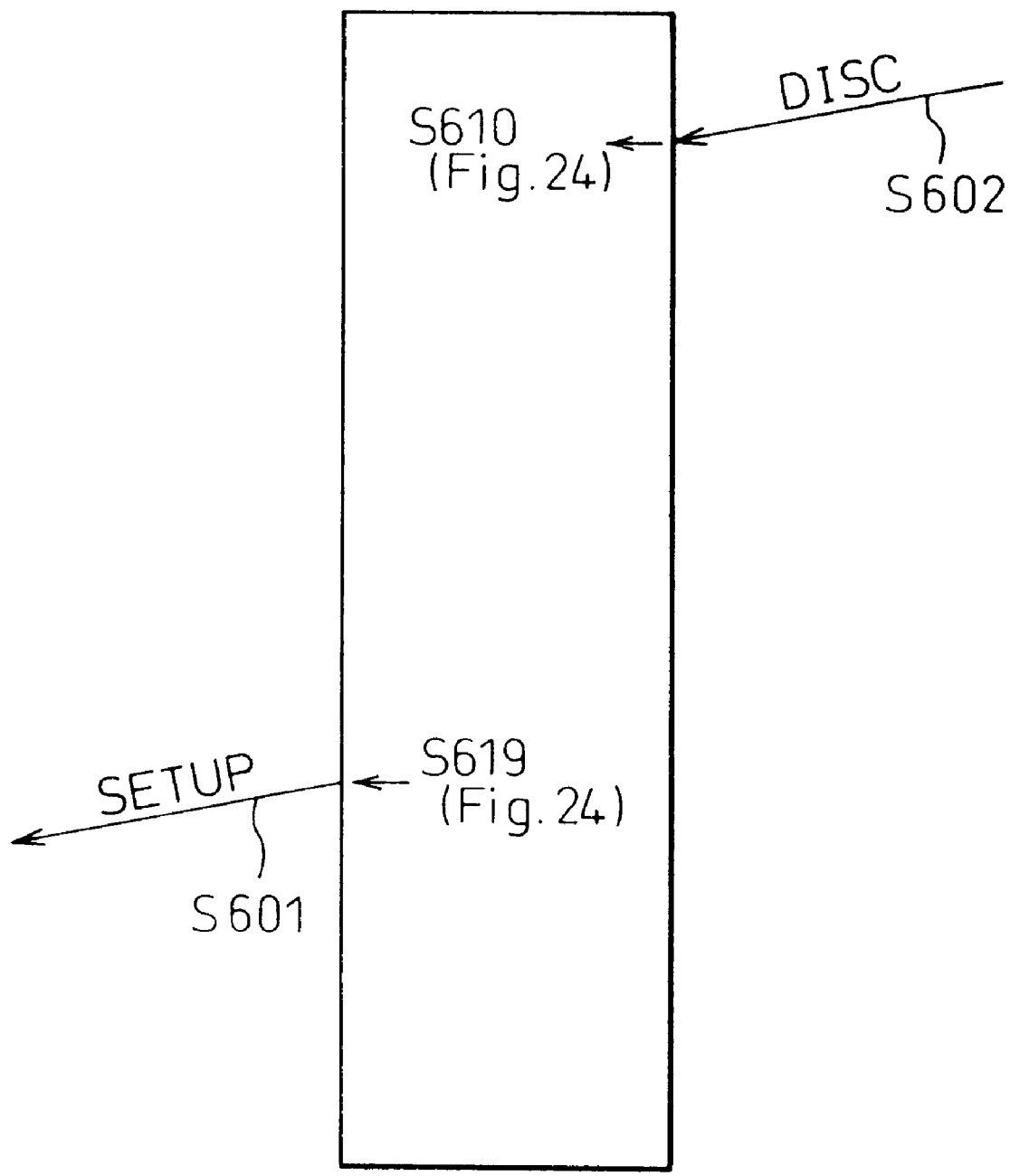
FIG. 23 is a drawing which shows the communication sequence for the sixth communication mode according to the present invention.

FIG. 23 illustrates the communication sequence of the sixth communication mode according to the present invention, this showing the communication sequence a station containing a calling terminal and a relay station.

Figure 24A:
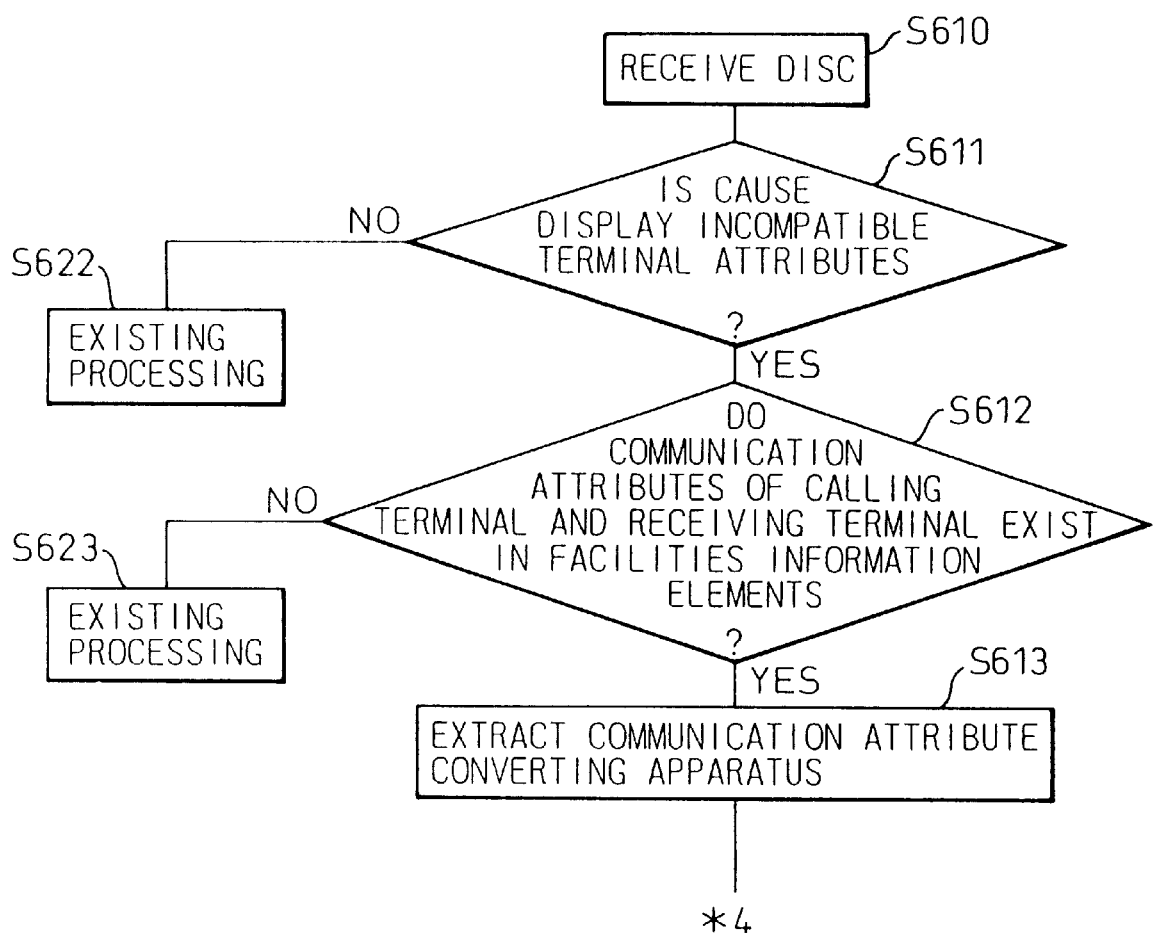
FIGS. 24A and B are flow diagrams which show the processing flow for messages shown in FIG. 23.
Figure 24B:
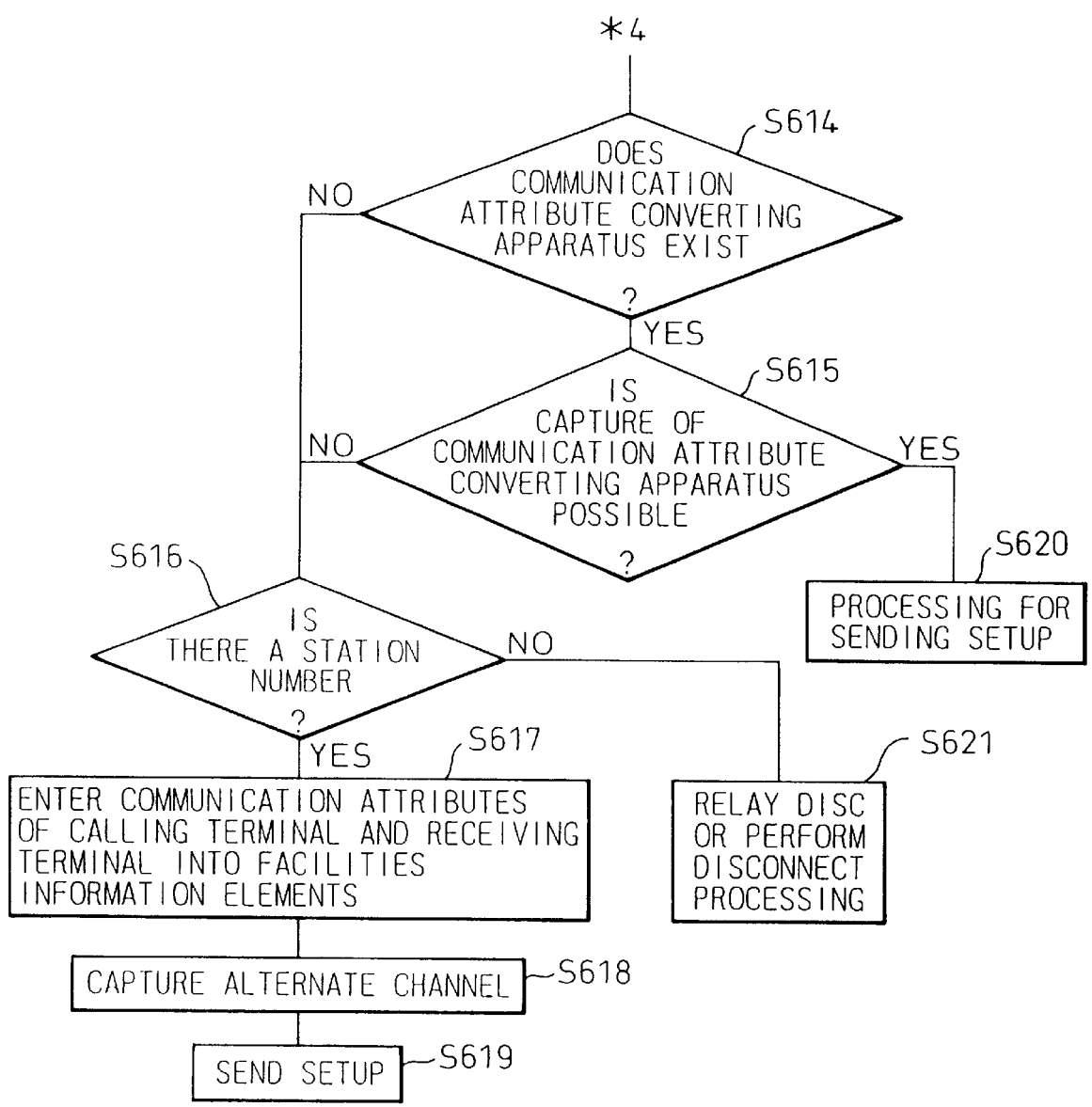

FIGS. 24A and 24B show an example of the processing flow for the messages shown in FIG. 23.

At a station containing a calling terminal or a relay station having the configuration shown in FIGS. 1A and 1B, based on the dialing information when a call is made, the station number control section 49 performs extraction of the station number, and stores this in the station number storage area 53.

When the station containing a calling terminal or a relay station receives a DISC message (S610 in FIG. 24A and S602 in FIG. 23), if the cause display of the cause display information elements of the DISC message is not "incompatible terminal attributes," the message receiving control section 43 performs existing processing (S622 in FIG. 24A). If however it is "incompatible terminal attributes," even if the facilities information elements do not include the communication attributes of the calling terminal and receiving terminal, existing processing is performed (S623 in FIG. 24B). However, if the communication attributes exist, the communication attribute converting apparatus management control apparatus 45 performs extraction from the communication attribute converting apparatus data 52 of a communication attribute converting apparatus that converts the communication attributes of the calling terminal to the communication attributes of the receiving terminal (S612 and S613 in FIG. 24A).

If there is a communication attribute converting apparatus, and it is possible to capture it, the processing for sending a SETUP message in which the communication attributes of the calling terminal are converted to the communication attributes of the receiving terminal is performed, in the same manner as in steps S416 and S417 in FIG. 19 at the station containing the calling terminal or in the same manner as in steps S516 and S517 in FIG. 22 at the relay station. The station number control section 49 performs a judgment as to whether there is a station number in the station number storage area 53, and if there is no station number either relay processing of the DISC message shown in steps S518 and S519 in FIG. 22 or disconnect processing (S621 in FIG. 24) is performed.

If there is a station number, the communication attributes of the calling terminal and the receiving terminal of the facilities information elements of the DISC message received by the message transmitting control section 41 are set into the facilities information elements of the SETUP message (S617 of FIG. 24). The channel capture control section 47 captures an alternate route channel based on the station number from the station number storage area 53 (S618 in FIG. 24), and the above-noted SETUP message is sent via that channel (S619 in FIG. 24 and S601 in FIG. 23).

Figure 25:
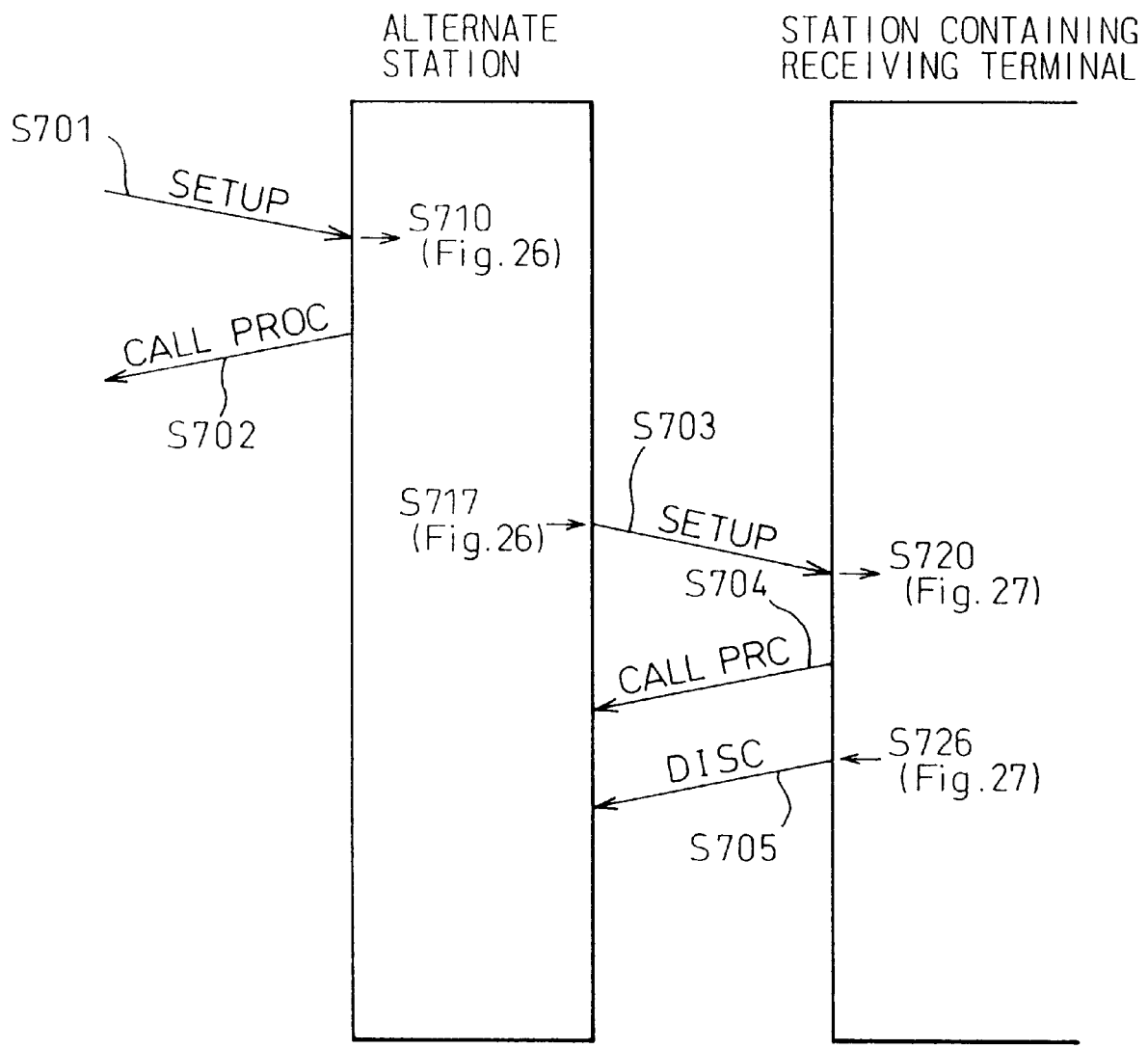
FIG. 25 is a drawing which shows the communication sequence for the seventh communication mode according to the present invention.

FIG. 25 illustrates the communication sequence of the seventh communication mode according to the present invention, this showing the communication sequence between an alternate station and a station containing a receiving terminal.

Figure 26:
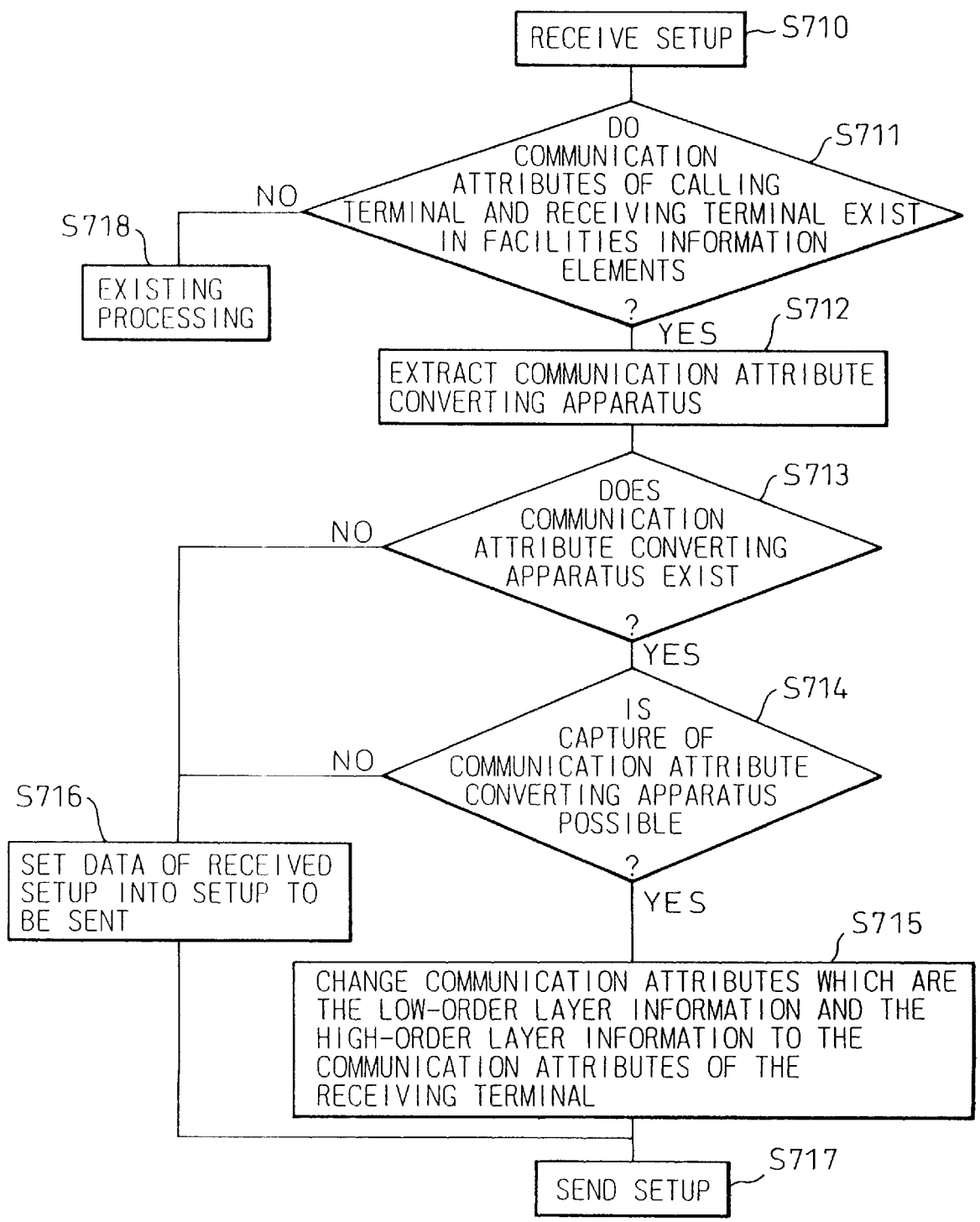
FIG. 26 is flow diagram which shows the processing flow (1) for messages shown in FIG. 25.
Figure 27:
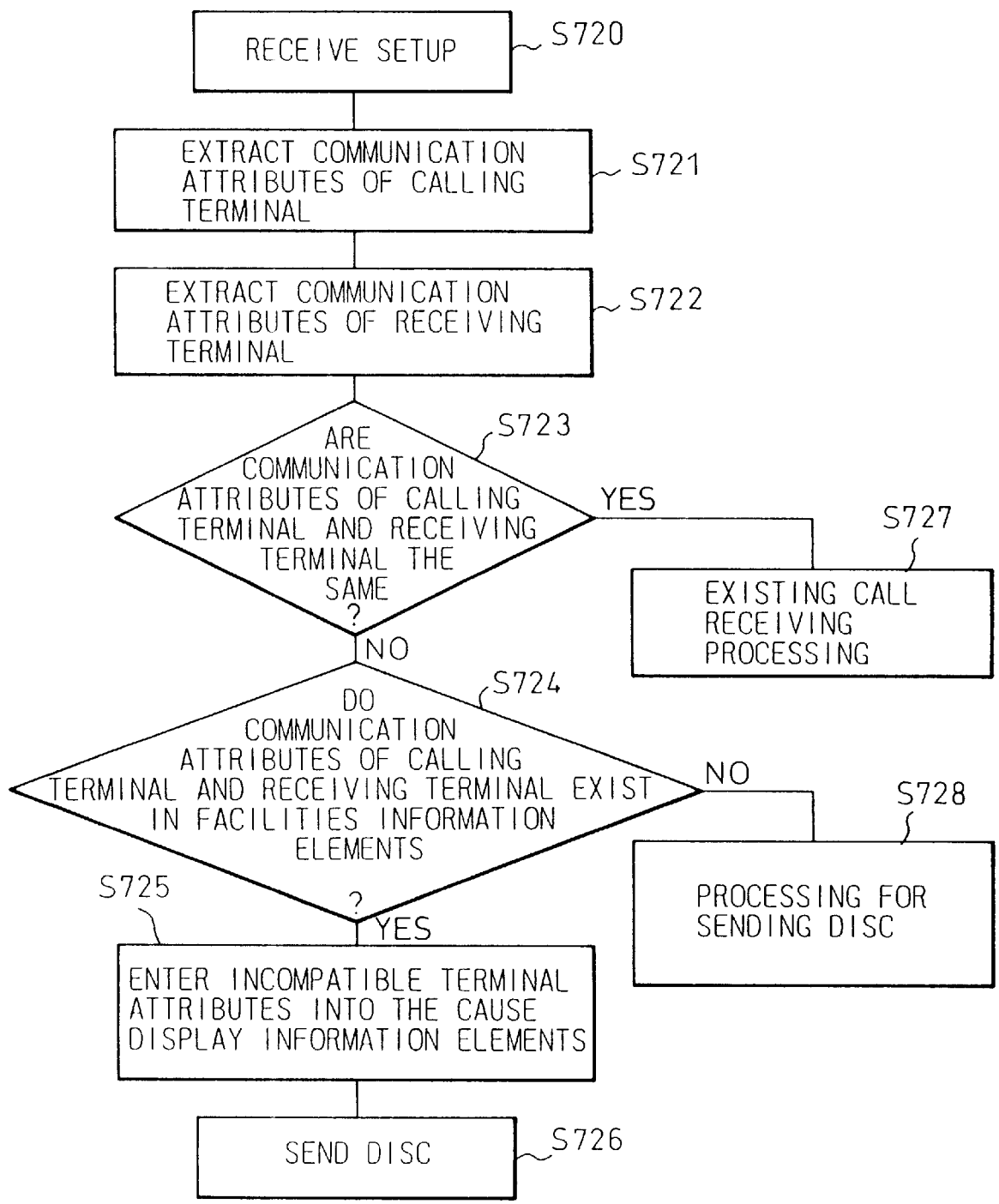
FIG. 27 is flow diagram which shows the processing flow (2) for messages shown in FIG. 25.

FIG. 26 and FIG. 27 show the example of the processing flow of the messages shown in FIG. 25.

When a SETUP message is received via channel 21 by an alternate station having the configuration shown in FIGS. 1A and 1B (S710 in FIG. 26 and S701 in FIG. 25), at the message receiving control section 43, if the facilities information elements thereof do not contain the communication attributes of the calling terminal and the receiving terminal, existing processing is performed (S711 and S718 in FIG. 26). If these communication attributes are included in the facilities information elements, however, the communication attribute converting apparatus management control apparatus 45 performs extraction from the communication attribute converting apparatus data 52 of the communication attribute converting apparatus which converts the communication attributes of the calling terminal to the communication attributes of the receiving terminal (S711 and S712 in FIG. 26).

If there is a communication attribute converting apparatus and the communication attribute converting apparatus capture control section 46 is able to capture the communication attribute converting apparatus, the message transmitting control section 41 converts the communication attributes of the low-order layer information and high-order layer information of the calling terminal to the communication attributes of the receiving terminal and adds these to the SETUP message (S713 through S715 in FIG. 26), the SETUP message being sent to the station containing the receiving terminal via channel 22, which is captured by the channel capture control section 47 (S717 in FIG. 26 and S703 in FIG. 25).

If there is either no communication attribute converting apparatus or it is not possible to capture the communication attribute converting apparatus, the SETUP message data received by the message relaying control section 42 is set as is into a SETUP message for sending (S716 in FIG. 26), and the message transmitting control section 41 sends this SETUP message via the channel 22, which is captured by the channel capture control section 47 (S717 in FIG. 26 and S703 in FIG. 25).

At a station containing a receiving terminal and having the configuration shown in FIGS. 1A and 1B, when the above-noted SETUP message is received via the channel 21 (S720 in FIG. 27), the message receiving control section 43 extracts the communication attributes of the calling terminal from the low-order layer information and high-order layer information of the SETUP message, and the terminal data management control section 44 extracts the communication attributes from the terminal data 51 of the receiving terminal (S721 and S722 in FIG. 27).

If the communication attributes of the calling terminal and the communication attributes of the receiving terminal coincide, existing processing is performed (S723 and S727 in FIG. 27). If they do not coincide, however, and the communication attributes of the calling terminal and receiving terminal are not contained in the facilities information elements, the processing that is performed is the same as the DISC message sending processing of steps S434 through S436 in FIG. 20 (S728 in FIG. 27). If the above-noted communication attributes exists, the message transmitting control section 41 enters "incompatible terminal attributes" into the cause display informations elements of the DISC message (S725 in FIG. 27), and this DISC message is sent without adding facilities information elements (S726 in FIG. 27 and S705 in FIG. 25).

As described above, according to the present invention, in the case of performing communication between terminals which bridge different networks and have mutually differing communication attributes, if the communication attributes of the receiving terminal can be controlled at a different station and there is a communication attribute converting apparatus that can convert the communication attributes of a calling terminal within the network to a receiving terminal, it is possible to automatically capture the communication attribute converting apparatus, thereby enabling communication between terminals having differing communication attributes.

As a result, there is no need for the user to be aware of the communication attributes of the other terminal, this feature greatly enhancing the ease of operation and convenience to the user. Even in the case in which it is not possible to capture a communication attribute converting apparatus, because it can be captured at another station, it is possible to make the maximum effective use of system resources. In addition, because the present invention makes use of previous switching processing almost entirely, it can be implemented easily and economically.

What is claimed is:

1. A method of automatically capturing a communication attribute converting apparatus for used when communication is performed between terminals which have mutually differing communication attributes defined by ISDN low-order layer information and high-order layer information in a network made up of electronic switching exchanges which support the ISDN protocol, comprising the steps of:

in the station containing a calling terminal, if there is a communication attribute converting apparatus that can convert the communication attributes of the calling terminal to the communication attributes of a receiving terminal, the entering of convertible communication attributes into information elements which are used for transfer of control information in the network and which can be added to the ISDN layer 3 call setting message and sending thereof to a station which contains said receiving terminal;

in the station containing the receiving terminal, when said ISDN layer 3 call setting message is received, if there are not only communication attributes which can be converted to the communication attributes of said calling terminal in said information elements which are used for control information transfer between networks but also one of said communication attributes coincides with the communication attributes of said receiving terminal, the entering of a request to capture a communication attribute converting apparatus which can perform conversion to the communication attributes of the receiving terminal into the information elements used for control information transfer between networks and which can be added to an ISDN layer 3 supplementary service message, and the sending thereof to said station which contains said calling terminal;

in the station containing the calling terminal, when said ISDN layer 3 supplementary service message is received, in the case in which there is, in said information elements used for control information transfer between networks, said request to capture a communication attribute converting apparatus which can perform conversion to the communication attributes of said receiving terminal, the capture of the communication attribute converting apparatus, the entering into the information elements used for control information transfer between networks which can be added to an ISDN layer 3 supplementary service verification message of whether or not capture is possible, and the sending thereof to said station which contains said receiving terminal;

in said station containing said receiving terminal, when said ISDN layer 3 supplementary service verification message is received, in the case in which said information element indicate capture is possible, the causing of said receiving terminal to receive the call and the sending of said ISDN layer 3 calling message and response message to said calling station; and in the case in which said information elements indicate that capture is not possible, the sending of the ISDN layer 3 disconnect message to said calling terminal.

2. A method of automatically capturing a communication attribute converting apparatus according to claim 1, further comprising the steps of:

in a relay station, when a call setting message is received from said station containing said calling terminal, the extraction of the communication attributes of said calling terminal by means of the low-order layer information and the high-order layer information accompanying said call setting message;

if there is a communication attribute converting apparatus that can convert the communication attributes of said calling terminal, the addition of convertible communication attributes to said information elements used for transfer of control information between networks;

when a supplementary service message is received from said station containing said receiving terminal, if there is a communication attribute converting apparatus that can perform conversion to the communication attributes of said receiving terminal, the capture thereof, the entering of information of whether or not said capture was possible into said information elements used for control information transfer between networks and which can be added to an ISDN layer 3 supplementary service verification message, and the sending thereof to said station containing said receiving terminal; and in the case in which said communication attribute converting apparatus does not exist, the relaying of a supplementary service message from said station containing said receiving terminal.

3. A method of automatically capturing a communication attribute converting apparatus according to claim 1, further comprising the steps of:

in a relay station, when a supplementary service message is received from said station containing said receiving terminal, in the case in which there is a communication attribute converting apparatus which can convert the communication attributes of said receiving terminal but it cannot be captured, the relaying of a supplementary service message from said station containing said receiving terminal, and in said station containing said calling terminal, when said supplementary service message is received, in the case in which there is no communication attribute converting apparatus, capture-not-possible information is entered into said information elements which can be used for transfer of control information between networks and which can be added to said supplementary service verification message and the sending thereof to said station containing said receiving terminal.

4. A method of automatically capturing a communication attribute converting apparatus for used when communication is performed between terminals which have mutually differing communication attributes defined by ISDN low-order layer information and high-order layer information in a network made up of electronic switching exchanges which support the ISDN protocol, comprising the steps of:

in a station containing a calling terminal, when an ISDN layer 3 call setting message is received, communication attributes of the low-order layer information and high-order layer information which accompany said call setting message differ from the communication attributes of a receiving terminal, the entering of "incompatible terminal attributes" into cause display data elements which accompany an ISDN layer 3 disconnect message, the entering of the communication attributes of said calling terminal and said receiving terminal into the information elements which are used for transfer of control information between networks and which are addable thereto, and the sending thereof to station containing said calling terminal; and in said station containing said calling terminal, when said ISDN layer 3 disconnect message is received, if not only the cause display information elements accompanying said disconnect message are "incompatible terminal attributes," but also the communication attributes of said calling terminal and said receiving terminal exist in the information elements which are used for transfer of control information between networks, in the case in which it is possible to capture a communication attribute converting apparatus that can convert the communication attributes of said calling terminal to the communication attributes of said receiving terminal, the capture thereof, the changing of the communication attributes of the calling terminal which are defined by the low-order layer information and the high-order layer information, and the resending of said ISDN layer call setting message to said station containing said receiving terminal.

5. A method of automatically capturing a communication attribute converting apparatus according to claim 4, further comprising the steps of:

in a relay station, when said ISDN layer 3 disconnect message is received from said station containing said receiving terminal, if not only the cause display information elements accompanying said disconnect message are "incompatible terminal attributes," but also the communication attributes of said calling terminal and said receiving terminal exist in the information elements used for transfer of control information between networks, in the case in which it is possible to capture a communication attribute converting apparatus capable of conversion of the communication attributes of said calling terminal to the communication attributes of said receiving terminal, the capture thereof, the changing of the communication attributes of the calling terminal which are defined by the low-order layer information and the high-order layer information, and the resending of said ISDN layer call setting message to said station containing said receiving terminal; and if there is no said communication attribute converting apparatus capable of said conversion or said communication attribute converting apparatus cannot be captured, the relaying of a disconnect message to said station containing said calling terminal.

6. A method of automatically capturing a communication attribute converting apparatus according to claim 4, further comprising the steps of:

in said station containing said calling terminal or in a relay station, the extraction of a station number based on dialing information at the time of calling and the storing thereof;

when a disconnect message is received from said station containing said receiving terminal, if either there is no communication attribute converting apparatus capable of converting the communication attributes of said calling terminal to the communication attributes of said receiving terminal, or said communication attribute converting apparatus cannot be captured, the capturing of an alternate channel based on said stored station number, the entering of the communication attributes of said calling terminal and said receiving terminal into the information elements which are used for transfer of control information between networks and which can be added to an ISDN layer 3 call setting message, and the sending of said call setting message via said alternate route channel;

in the alternate route station, in the case in which it is possible to capture a communication attribute converting apparatus capable of converting the communication attributes of said calling terminal to the communication attributes of said receiving terminal, the capturing thereof, and the sending of a call setting message which has had the communication attributes of said calling terminal defined by the low-order layer information and the high-order layer information to the communication attributes of said receiving terminal;

if either there is no said communication attribute converting apparatus capable of conversion or said communication attribute converting apparatus cannot be captured, the relaying of said received call setting message; and in said station containing said receiving terminal, when said call setting message is received, if not only the communication attributes of the low-order layer information and high-order layer information accompanying said call setting message is different from the communication attributes of the receiving terminal but also the communication attributes of the calling terminal and the communication attributes of the receiving terminal exist in the information elements used for transfer of control information between networks, the sending of a disconnect message to which the information elements used for transfer of control information between networks are not added.

7. A method of automatically capturing a communication attribute converting apparatus according to claim 1, wherein facilities information element is used as said information element which are used for transfer of control information between networks.

8. A method of automatically capturing a communication attribute converting apparatus according to claim 1, wherein a FACILITY message is used as said ISDN layer 3 supplementary service message and further wherein a FACILITY_ACK message is used as said ISDN layer 3 verification message.

9. An automatic capturing apparatus of a communication attribute converting apparatus in a station containing a calling terminal used when communication is performed between terminals which have mutually differing communication attributes defined by ISDN low-order layer information and high-order layer information in a network made up of electronic switching exchanges which support the ISDN protocol comprising:

means for entering into the information elements which are used for transfer of control information between networks and which can be added to the ISDN layer 3 call setting message and sending thereof when there is a communication attribute converting apparatus which can convert the communication attributes and means for capturing a communication attribute converting apparatus when there is a communication attribute converting apparatus capture request for a communication attribute converting apparatus that can perform conversion to the communication attributes of the receiving terminal in the information elements which are used for transfer of control information between networks when an ISDN layer 3 supplementary service message is received from the station containing a receiving terminal with respect to said ISDN layer 3 call setting message, for entering the information of whether or not capture thereof was successful into the information elements which are used for transfer of control information between networks and which can be added to the ISDN layer 3 call setting message, and for sending this to said station containing said receiving terminal.

10. An automatic capturing apparatus of a communication attribute converting apparatus in a station containing a calling terminal according to claim 9, further comprising:

means for entering, when there is no communication attribute converting apparatus when said supplementary service message is received, the information of whether or not the information elements which are used for transfer of control information between networks and which can be added to said supplementary service verification message include the information of whether or not capture is possible and for outputting this to the station containing a receiving terminal.

11. An automatic capturing apparatus of a communication attribute converting apparatus in a station containing a receiving terminal used when communication is performed between terminals which have mutually differing communication attributes defined by ISDN low-order layer information and high-order layer information in a network made up of electronic switching exchanges which support the ISDN protocol comprising:

means for entering into the information elements used for transfer of control information between networks and which can be added to an ISDN layer 3 supplementary service message a request to capture a communication attribute converting apparatus which can perform conversion to the communication attributes of the receiving terminal in the case in which not only are there communication attributes which can be converted to the communication attributes of the calling terminal in the information elements used for transfer of control information between networks and which can be added to an ISDN layer 3 call setting message but also one of these communication attributes coincides with the communication attributes of the receiving terminal and for sending these to a station containing a calling terminal;

means for causing a call to be received by a receiving terminal when an ISDN layer 3 supplementary service verification message with respect to said supplementary service message is received from a station containing a calling terminal in the case in which the information elements used for transfer of control information between networks and which can be added to an ISDN layer 3 call setting message include information that the capture of a communication attribute converting apparatus is possible, and for sending an ISDN layer 3 calling message or response message to said station containing said calling terminal; and means for sending an ISDN disconnect message to said station containing said calling terminal in the case in which said information elements indicate that capture is not possible.

12. An automatic capturing apparatus of a communication attribute converting apparatus in a relay station used when communication is performed between terminals which have mutually differing communication attributes defined by ISDN low-order layer information and high-order layer information in a network made up of electronic switching exchanges which support the ISDN protocol comprising:

means for extracting the communication attributes of a calling terminal from said low-order layer information and the high-order layer information which accompany a call setting message when said message is received from a station containing a calling terminal;

means for adding to information elements used for transfer of control information between networks convertible communication attributes if there is a communication attribute converting apparatus that can convert the communication attributes of said calling terminal;

means, when an ISDN layer 3 supplementary service message is received from a station containing a receiving terminal, for capturing a communication attribute converting apparatus when there is a communication attribute converting apparatus that can perform conversion to the communication attributes of the receiving terminal, for entering into the information elements used for transfer of control information between networks and which can be added to an ISDN layer 3 supplementary service verification message information of whether or not said capture was possible, and for sending this to said station containing said receiving terminal; and means, in the case of there being no said communication attribute converting apparatus, for relaying said supplementary service message from said station containing said receiving terminal.

13. An automatic capturing apparatus of a communication attribute converting apparatus according to claim 12, further comprising means, when said ISDN supplementary service message is received in the case in which there exists a communication attribute converting apparatus capable of conversion to the communication attributes of the receiving terminal but it cannot be captured, for relaying said supplementary service message.

14. An automatic capturing apparatus of a communication attribute converting apparatus in a station containing a receiving terminal used when communication is performed between terminals which have mutually differing communication attributes defined by ISDN low-order layer information and high-order layer information in a network made up of electronic switching exchanges which support the means, when an ISDN layer 3 call setting message is received and the low-order layer information and high-order layer information accompanying said call setting message differs from those of a receiving terminal, for entering into cause display information elements accompanying an ISDN disconnect message "incompatible terminal attributes," and for also entering the communication attributes of the calling and receiving terminals into the information elements which can be added to the ISDN disconnect message and used for transfer of control information in the network.

15. An automatic capturing apparatus of a communication attribute converting apparatus according to claim 14, further comprising a means, when a call setting message is received and the communication attributes of the low-order layer information and high-order layer information accompanying said call setting message are different from the communication attributes of the calling terminal, in the case in which the communication attributes of both the calling terminal and receiving terminal are included in the information elements used for transfer of control information between networks, for sending a disconnect message to which information elements used for transfer of control information between networks have not been added.

16. An automatic capturing apparatus of a communication attribute converting apparatus in a station containing a calling terminal used when communication is performed between terminals which have mutually differing communication attributes defined by ISDN low-order layer information and high-order layer information in a network made up of electronic switching exchanges which support the ISDN protocol comprising:

means, when an ISDN disconnect message is received, and the received message has the cause display information elements indicating "incompatible terminal attributes" and the communication attributes of calling and receiving terminals in the information elements used for transfer protocol in the network, and it is possible to capture a communication attributes converting apparatus that can perform conversion of the communication attributes of a calling terminal to the communication attributes of a receiving terminal, for resending the ISDN call setting message to the station containing the receiving terminal after capturing said communication attributes converting apparatus and changing the attributes of the calling terminal to that of the receiving terminal by said conversion.

17. An automatic capturing apparatus of a communication attribute converting apparatus in a relay station used when communication is performed between terminals which have mutually differing communication attributes defined by ISDN low-order layer information and high-order layer information in a network made up of electronic switching exchanges which support the ISDN protocol comprising:

means, when an ISDN disconnect message is received and not only are the cause display information elements accompanying said disconnect message "incompatible terminal attributes," but also the communication attributes of both the calling terminal and the receiving terminal exist in the information elements used for transfer of control information between networks, in the case in which it is possible to capture a communication attribute converting apparatus which can convert the communication attributes of the calling terminal to the communication attributes of the receiving terminal, for capturing said communication attribute converting apparatus, for changing the communication attributes defined by the low-order layer information and the high-order layer information to the communication attributes of the receiving terminal, and for resending the call setting message to the station containing the receiving terminal, and means, when either there is no communication attribute converting apparatus capable of conversion or said communication attribute converting apparatus cannot be captured, for relaying a disconnect message.

18. An automatic capturing apparatus of a communication attribute converting apparatus according to claim 17, further comprising:

means for storing a station number based on dialing information when a call is made;

means for capturing an alternate channel based on said station number; and means, when said disconnect message is received, in the case of there either being no communication attribute converting apparatus capable of conversion of the communication attributes of the calling terminal to the communication attributes of the receiving terminal, for entering the communication attributes of both the calling terminal and the receiving terminal into the information elements used for transfer of control information between networks and which can be added to an ISDN layer 3 call setting message, and for sending said call setting message via an alternate channel that is captured by said alternate channel capture means.

19. An automatic capturing apparatus of a communication attribute converting apparatus in an alternate station used when communication is performed between terminals which have mutually differing communication attributes defined by ISDN low-order layer information and high-order layer information in a network made up of electronic switching exchanges which support the ISDN protocol comprising:

means, when a call setting message is received, in the case in which it is possible to capture a communication attribute converting apparatus that can perform conversion of the communication attributes of a calling terminal to the communication attributes of a receiving terminal, for capturing said communication attribute converting apparatus, and for sending a call setting message, after capturing said communication attributes converting apparatus and changing the attributes of the calling terminal to that of the receiving terminal by said conversion, and means, in the case of either there being no communication attribute converting apparatus capable of conversion or it not being possible to capture said communication attribute converting apparatus, for relaying a call setting message.

20. An automatic capturing apparatus of a communication attribute converting apparatus according to claim 9, wherein a FACILITY message is used as said ISDN layer 3 supplementary service message and further wherein a FACILITY_ACK message is used as said ISDN layer 3 verification message.

21. An automatic capturing apparatus of a communication attribute converting apparatus according to claim 9, wherein control is performed by using facilities information elements as said information elements used for transfer between networks.

22. A communication system which has a communication attributes conversion function and which includes nodes having a plurality of terminals having mutually differing communication attributes, and in which communication is performed therebetween, comprising:

means, when in setting the communication path between a calling terminal and a receiving terminal, in the case in which a communication node which connects a calling terminal and a receiving terminal has a conversion function which converts from one communication attributes to other communication attributes, for notifying the receiving terminal of information with regard to said communication attributes conversion, and means for establishing communication attributes, for the purpose of performing mutual communication between terminals, from the convertible communication attributes of which said receiving terminal was notified, wherein communication attributes of information sent from a calling terminal are converted to other communication attributes at a communication node having a communication attributes conversion function and are send to a receiving terminal.

23. A communication attributes conversion method in a communication system in which terminals having mutually differing communication attributes bridge one or a plurality of networks, comprising the steps:

if a communication attribute converting apparatus which can convert the communication attributes of the calling terminal exist in a station containing a calling terminal, the entering of the convertible communication attributes into the information elements of a call setting message and the sending thereof to a station containing a receiving terminal;

in a station containing a receiving terminal, when said call setting message is received, if in the said information elements used for transfer of control information between networks there are communication attributes which can be converted to the communication attributes of the calling terminal and these coincide with the communication attributes of the receiving terminal, the entering of a request to capture a communication attribute converting apparatus which can perform conversion to the communication attributes of the receiving terminal and the sending thereof to the station containing the calling terminal; and in the station containing the calling terminal, capturing of the communication attribute converting apparatus in accordance with said capture request.

24. An automatic capturing apparatus of a communication attribute converting apparatus according to claim 11, wherein a FACILITY message is used as said ISDN layer 3 supplementary service message and further wherein a FACILITY_ACK message is used as said ISDN layer 3 verification message.

25. An automatic capturing apparatus of a communication attribute converting apparatus according to claim 11, wherein control is performed by using facilities information elements as said information elements used for transfer between networks.

26. An automatic capturing apparatus of a communication attribute converting apparatus according to claim 12, wherein a FACILITY message is used as said ISDN layer 3 supplementary service message and further wherein a FACILITY_ACK message is used as said ISDN layer 3 verification message.

27. An automatic capturing apparatus of a communication attribute converting apparatus according to claim 12, wherein control is performed by using facilities information elements as said information elements used for transfer between networks.

28. An automatic capturing apparatus of a communication attribute converting apparatus according to claim 14, wherein control is performed by using facilities information elements as said information elements used for transfer between networks.

29. An automatic capturing apparatus of a communication attribute converting apparatus according to claim 16, wherein control is performed by using facilities information elements as said information elements used for transfer between networks.

30. An automatic capturing apparatus of a communication attribute converting apparatus according to claim 17, wherein control is performed by using facilities information elements as said information elements used for transfer between networks.

31. An automatic capturing apparatus of a communication attribute converting apparatus according to claim 19, wherein control is performed by using facilities information elements as said information elements used for transfer between networks.

* * * * *